US007119700B2

(12) United States Patent
Rotta et al.

(10) Patent No.: US 7,119,700 B2
(45) Date of Patent: Oct. 10, 2006

(54) APPARATUS AND METHOD FOR CONTROLLING AN AIRCRAFT COOLING AND SMOKE SYSTEM USING DISCRETE COMPONENTS

(75) Inventors: Phillip R Rotta, Kirkland, WA (US); Thomas R Hasenoehrl, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 208 days.

(21) Appl. No.: 10/771,206

(22) Filed: Feb. 2, 2004

(65) Prior Publication Data

US 2005/0178539 A1 Aug. 18, 2005

(51) Int. Cl.
*G08B 17/10* (2006.01)
(52) U.S. Cl. ...................... 340/628; 165/235; 340/500; 340/506
(58) Field of Classification Search ................. 340/628
See application file for complete search history.

(56) References Cited

U.S. PATENT DOCUMENTS 4,818,970 A * 4/1989 Natale et al. .......... 340/539.26
5,451,929 A * 9/1995 Adelman et al. ........... 340/627
5,914,453 A * 6/1999 James et al. ................ 340/628
6,779,735 B1 * 8/2004 Onstott ........................ 236/13
2004/0124989 A1 * 7/2004 Bachinski et al. .......... 340/628
2005/0046563 A1 * 3/2005 Whitney ..................... 340/506
2005/0078003 A1 * 4/2005 King .......................... 340/506

* cited by examiner

*Primary Examiner*—Jeffery Hofsass
*Assistant Examiner*—Eric Blount
(74) *Attorney, Agent, or Firm*—Harness Dickey & Pierce P.L.C.

(57) ABSTRACT

A combined smoke detector and cooling control system for a mobile platform is operable to control multiple electronic units. A smoke detector is connected to the electronic unit and operates to identify a smoke event. A cooling system is connected to the electronic unit. A fan in the cooling system includes a switch which indicates if a cooling system fault occurs. A plurality of relays connect to the electronic unit, the smoke detector and the cooling system. If a cooling system fault occurs, a first relay immediately de-energizes the cooling system. After a fixed period of smoke persistence during a smoke event, a second relay de-energizes the cooling system.

52 Claims, 28 Drawing Sheets

Power Control Logic Table

| System Master Switch | Emergency Shutoff Switch | Smoke Even | Fan Failure | System #1 Relay Command | System #1 Switch | System #3 Switch | System #2 Switch |
|---|---|---|---|---|---|---|---|
| OFF | X | X | X | X | X | X | X |
| X | OFF | X | X | X | X | X | X |
| ON | ON | YES | X | X | X | X | X |
| ON | ON | X | YES | X | X | X | X |
| ON | ON | NO | NO | LOW | X | X | X |
| ON | ON | NO | NO | HIGH | OFF | OFF | OFF |
| ON | ON | NO | NO | HIGH | OFF | OFF | ON |
| ON | ON | NO | NO | HIGH | OFF | ON | OFF |
| ON | ON | NO | NO | HIGH | ON | OFF | OFF |
| ON | ON | NO | NO | HIGH | ON | OFF | ON |
| ON | ON | NO | NO | HIGH | ON | ON | OFF |
| ON | ON | NO | NO | HIGH | ON | ON | ON |

| X | is defined as a "Don't Care". |
| LOW | is indicating that this discrete input is connected to ground (GND State). |
| HIGH | is indicating that this discrete input is not connected to ground (OPEN State). |

Fig. 21A

Power Control Logic Table (Continued)

| | | | POWER OUTPUTS | | | |
|---|---|---|---|---|---|---|
| System # 1 | System # 4 | System # 3 | System # 2 | Cooling System (AC) | System # 5 | System # 6 |
| OFF (1) | OFF (1) | OFF (1) | OFF (1) (3) | OFF | OFF (1) | OFF (1) |
| OFF | OFF | OFF | OFF | OFF | OFF | OFF |
| OFF | OFF | OFF | OFF | OFF | OFF | OFF |
| OFF (1) | OFF (1) | OFF (1) | OFF (1) (3) | OFF | OFF (1) | OFF (1) |
| OFF (1) | OFF (1) | X | X | X | X | X |
| OFF (1) | OFF (1) | OFF (1) | OFF (1) (3) | OFF | OFF (1) | OFF (1) |
| OFF (1) | OFF (1) | OFF (1) | ON (3) | ON | OFF (1) | OFF (1) |
| OFF (1) | OFF (1) | ON | OFF (1) (3) | OFF | OFF (1) | OFF (1) |
| OFF (1) | OFF (1) | ON | ON (3) | ON | OFF (1) | OFF (1) |
| ON | ON | OFF (1) | ON (2) (3) | ON | ON | ON |
| ON | ON | OFF (1) | ON (3) | ON | ON | ON |
| ON | ON | ON | ON (2) (3) | ON | ON | ON |
| ON | ON | ON | ON (3) | ON | ON | ON |

NOTES:
(1) This unit has its AC power removed 8 seconds after being commanded off.
(2) AC power will be applied to the System # 2 even after System # 2 switch is placed in the "OFF" position. When the System # 2 switch discrete output is commanded to the "OFF" position (OPEN State), System # 2 will internally start the graceful shutdown process. This process can take up to 1.5 minutes.
(3) Depending upon the aircraft installation, AC power for this unit may be connected to alternate outputs.

Fig. 21B

APPARATUS AND METHOD FOR CONTROLLING AN AIRCRAFT COOLING AND SMOKE SYSTEM USING DISCRETE COMPONENTS

FIELD OF THE INVENTION

The present invention relates in general to smoke detection systems and more specifically to an aircraft smoke detection and ventilation cooling control system and method of operation.

BACKGROUND OF THE INVENTION

The Federal Aviation Administration has promulgated regulatory changes that result in the need for more stringent smoke detection capability and cooling system power control capability for cooling systems installed in commercial aircraft. Such smoke detection and cooling power control systems typically provide smoke detection and cooling for a variety of electronic units, including, but not limited to, operations, communication and entertainment units. Exemplary electronic units for communication systems and connection to the World Wide Web via the Internet are provided in the Connection By Boeings$^{SM}$ system. Newly installed systems are required to provide smoke and cooling system detection and controls to prevent propagation of smoke from any of the cooling systems to any other compartment of the aircraft. The systems are also required to meet specific electronic system power control requirements.

For at least newly installed equipment, it is required that cooling systems be shut down upon the detection of a smoke event, to prevent smoke from one compartment from being transferred to one or more other compartments of the aircraft. A smoke event is defined herein as either the actual presence of smoke identified by an alarmed condition of one or more smoke detectors, or a falsely alarming smoke detector. It is also necessary to identify if a cooling system fault exists, defined herein as a locked cooling fan rotor, reduced cooling flow from a reduced fan rotation speed (below a predetermined speed criteria known in the art), or a cooling system overheat condition, as attempts to restart a locked or overheated cooling fan can increase the risk of a fire.

These smoke detection and cooling requirements can be met through development of controllers containing the necessary logic to perform smart controller functions. The cost and time to produce such controllers, however, can be prohibitive and may not support cost targets and delivery requirements for rapid turnaround, commercial aircraft installations. Therefore, a need exists for a system and a method to meet aircraft smoke detection and cooling power control system requirements without the cost and time required to develop an electronic unit capable of performing smart controller functions.

SUMMARY OF THE INVENTION

An Aircraft Cooling and Smoke System (ACSS), according to a preferred embodiment of the present invention, uses standard off-the-shelf relays and discrete components to perform required smoke detection and power control functions necessary for a commercial aircraft installation. An automatic test of a smoke detection system is conducted upon power-up of the ACSS. Upon detection of a cooling system fault, power to electronic systems connected to the cooling system(s) of the ACSS is automatically and immediately shut down. A delayed shutdown of the electronic systems of the ACSS is provided during normal system power control activity or a smoke event, providing time to perform necessary pre-power-down operations without loss of program or system data.

Certain electronic systems and/or cooling systems of the ACSS are latched in an "off" state following the detection of a smoke event or a cooling fault, such that the system cannot return to a normal operation without manual intervention following an appropriate maintenance action. The ACSS also provides for manual initiation of system tests. After a smoke event detected by the ACSS, but not a result of smoke generated by an ACSS controlled component, a system reset can be performed by crew or by flight attendants, once the cause of the smoke event is determined. This crew reset capability does not extend to a cooling system fault shutdown, which requires maintenance reset.

According to another preferred embodiment of the present invention, a control system disposed in a mobile platform, operable to control at least one electronic unit and at least one cooling device, comprises a smoke detector in communication with the electronic unit. The smoke detector operably identifyies a smoke event in the electronic unit. A cooling system includes the cooling device in communication with the electronic unit. At least one time delay unit creates a predetermined time period persistence delay. A plurality of relays are connected to at least one of the electronic unit, the smoke detector and the cooling system. The relays include at least the following: a first relay operable to immediately de-energize the cooling system following a cooling system fault; and a second relay operable to de-energize the cooling system after identification of the smoke event and following the persistence delay.

According to still another preferred embodiment of the present invention, a combined smoke detector and cooling control system operable to control a plurality of electronic units comprises a smoke detector operably identifying a smoke event in the electronic unit. A cooling system is in communication with the electronic unit. A fan in the cooling system includes at switch operable to indicate a cooling system fault. A plurality of relays includes at least one each of the following: a first relay operable to immediately de-energize the cooling system after indication of the cooling system fault; and a second relay operable after a predetermined time period persistence delay, the second relay operable to de-energize the cooling system after identification of the smoke event and following the persistence delay.

According to yet still another preferred embodiment of the present invention, a method for controlling an aircraft cooling and smoke system having a plurality of relays connected to at least one smoke detector and at least one cooling subsystem, the cooling subsystem operable to cool a plurality of electrical components, comprises: detecting a smoke event using the smoke detector; generating a smoke mode signal in response to the smoke event; applying a time delay unit to operably delay the smoke mode signal; performing a delayed shutdown of the cooling subsystem and the electrical components; and latching both the cooling subsystem and the electrical components in an off state using a first relay.

According to another preferred embodiment of the present invention, a method to control at least one cooling subsystem connected to a plurality of electrical components in response to one of a smoke detector smoke event and a cooling system fault for a mobile platform, comprises: changing a thermal switch position in response to the cooling system fault; immediately shutting down the cooling subsystem in response to changing the thermal switch position; blocking an automatic restart of the cooling subsystem using a test switch; and manually changing a position of the test switch to operably perform a maintenance test of the cooling subsystem prior to initiating a manual cooling subsystem restart.

The ACSS of the present invention offers several advantages. The ACSS is quickly implemented using standard relay logic, without a custom electronics unit traditionally used for such an application. An analog or a conventional time delay unit acts as a smoke persistence filter, helping to distinguish a true smoke event. An automatic power-up test eliminates the need for personnel involvement during initiation of system operation. A limited crew reset capability is also provided, distinguished from a maintenance-only reset, providing in-flight crew control to address nuisance faults. Multiple types of smoke indicators are also provided, in different areas of the aircraft, distinguishing between maintenance, flight deck and crew indication of smoke events or cooling system faults. Immediate shutdown of the cooling system occurs following a cooling system fault. A graceful shutdown is provided following a smoke event.

The features, functions, and advantages can be achieved independently in various embodiments of the present invention or may be combined in yet other embodiments.

BRIEF DESCRIPTION OF THE DRAWINGS

The present invention will become more fully understood from the detailed description and the accompanying drawings, wherein:

FIG. 21A is a first portion of a power control logic table for a system of the present invention;

FIG. 21B is a second portion of the power control logic table of FIG. 21A;

DETAILED DESCRIPTION OF THE PREFERRED EMBODIMENTS

The following description of the preferred embodiments is merely exemplary in nature and is in no way intended to limit the invention, its application, or uses. Reference is made herein to application of the present invention in a commercial aircraft. The present invention is not intended to be limited to aircraft applications, but is applicable to any mobile platform having ventilation and smoke detection systems.

Figure 1:
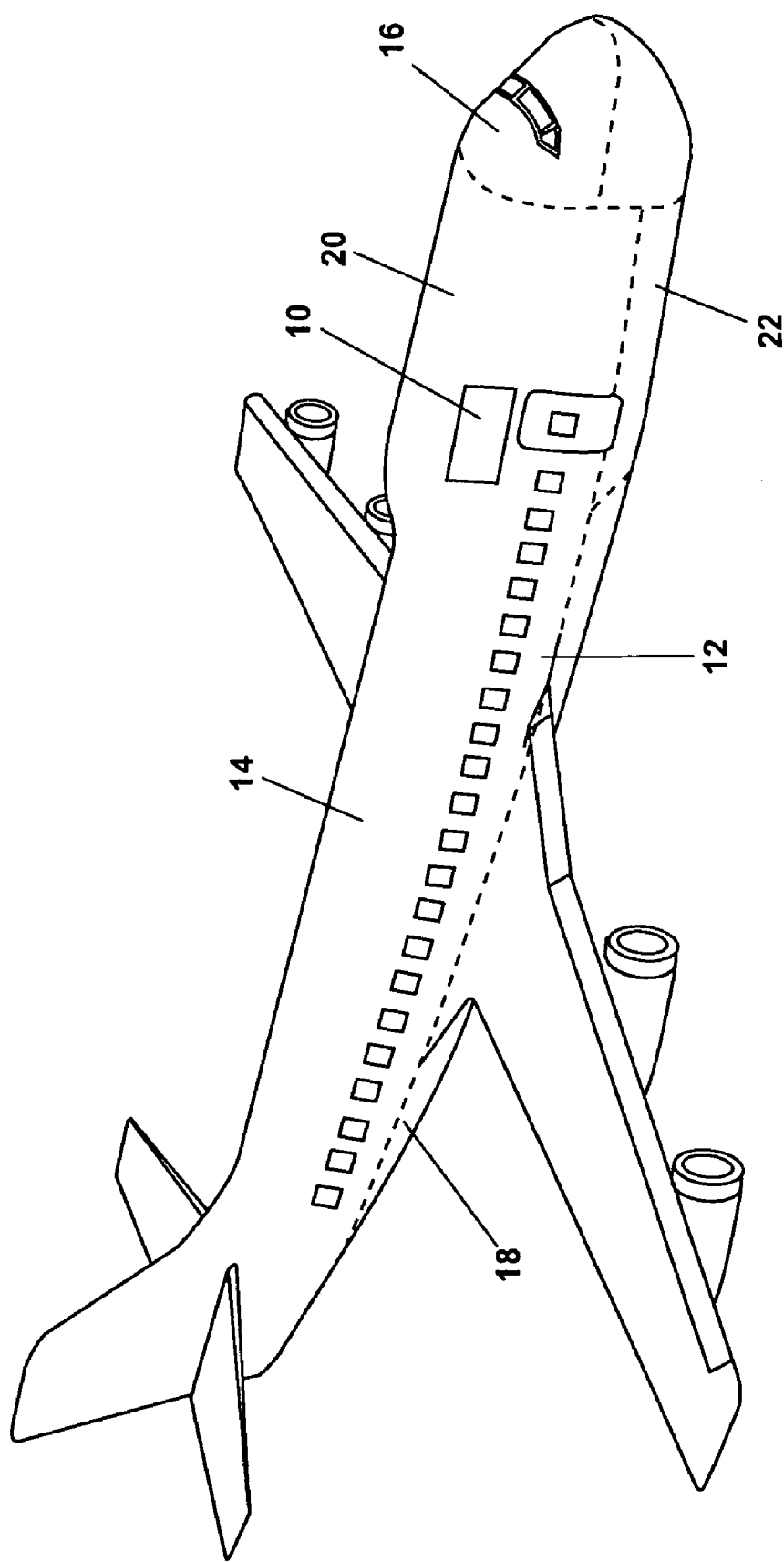
FIG. 1 is a perspective view of an aircraft having an aircraft cooling and smoke system according to a preferred embodiment of the present invention.

Referring to FIG. 1, and according to a preferred embodiment of the present invention, an Aircraft Cooling and Smoke System (ACSS) 10, is installed in an aircraft 12. Aircraft 12 commonly includes smoke detection and ventilation systems (not shown) for a passenger area 14, a flight deck area 16 and a stowage/cargo area 18. ACSS 10 can be used to control smoke detection and ventilation systems in any of these areas. In addition, electronics equipment, including communication and entertainment systems (not shown), such as equipment installed for the CONNECTION BY BOEING[SM] system are frequently added in areas of aircraft 12 including an overhead crown area 20 and a lower lobe area 22. ACSS 10 is particularly applicable when newly added electronic equipment is installed in any area of aircraft 12, to control smoke detection and ventilation systems. For purposes of example only, overhead crown area 20 is herein referred to as AREA 1 and lower lobe area 22 is herein referred to as AREA 2 for smoke event and cooling fault identification and indication.

Figure 2:
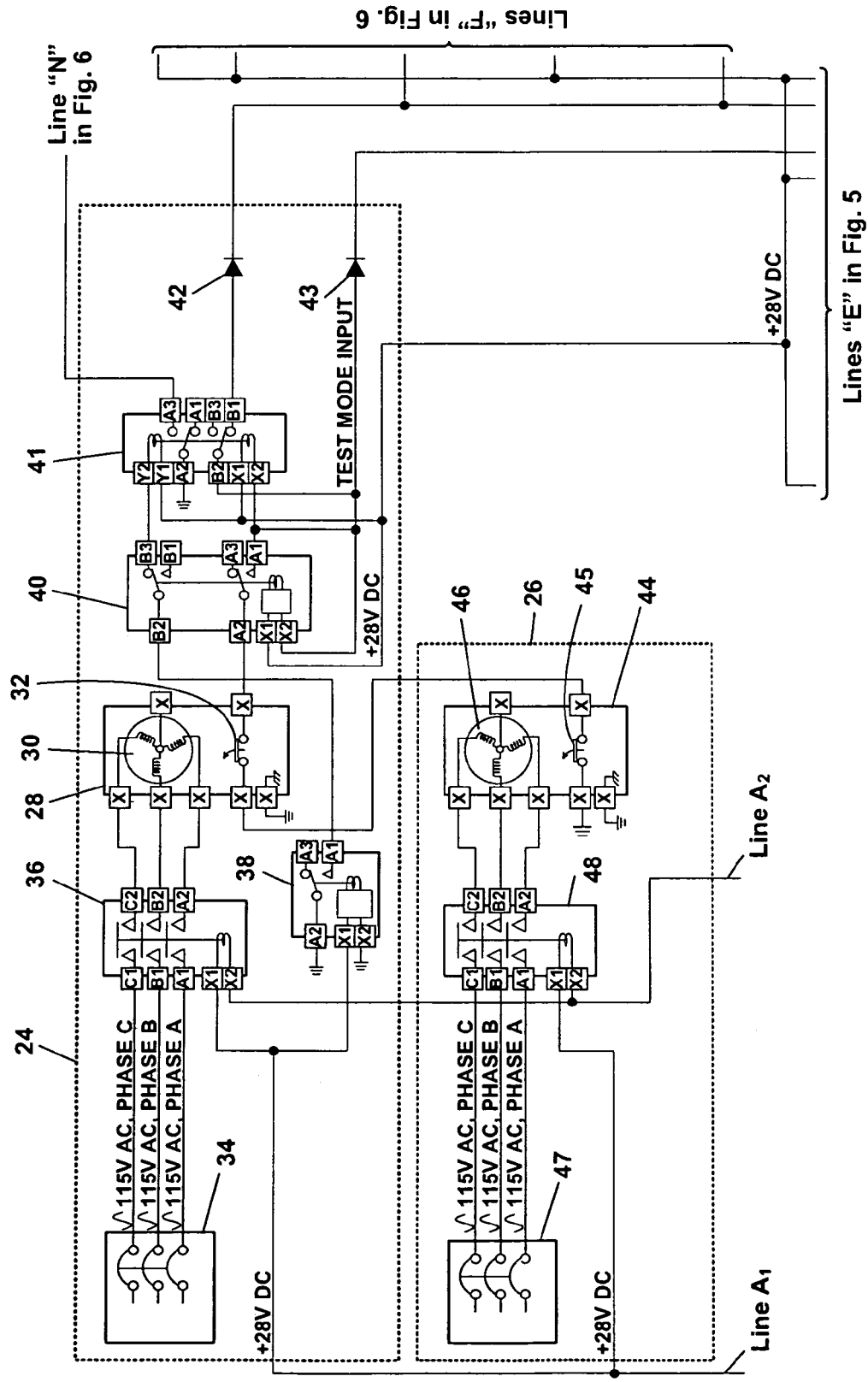
FIG. 2 is schematic of a cooling fan subsystem of the present invention.

Referring to FIGS. 2–8, ACSS 10, according to one preferred embodiment of the present invention, is identified in schematic form. In FIG. 2, components are shown which are operable to control a first cooling fan subsystem 24 and an optional second cooling fan subsystem 26. Any number of cooling fan subsystems can be used in ACSS 10. First cooling fan subsystem 24 includes a cooling fan 28, having a fan coil set 30 and at least one thermal switch 32. Thermal switch 32 operates by sensing an operating temperature of cooling fan 28, reacting to a predetermined overheat condition of cooling fan 28, and changing switch position to initiate a cooling fan 28 shutdown. An overheat condition can occur from a locked fan rotor or high temperature air entering the fan (such as during a fire). Also, a rotor turning at a slower than required RPM can generate a high temperature condition in a cooling fan. An AC power panel 34 provides 115 VAC, 400 Hz power via a cooling system fan 1 power relay 36 to cooling fan 28. First cooling fan subsystem 24 also includes a power-up inhibit relay 38, a cooling fan overheat fault relay 40, a cooling fan overheat fault latch relay 41 and a pair of isolation diodes 42, 43, respectively, whose functions will be described in greater detail herein. Second cooling fan subsystem 26 includes: a cooling fan 44 having a thermal switch 45 and a set of coils 46; an AC power panel 47, similar to AC power panel 34; and a cooling system fan 2 power relay 48, similar to cooling system fan 1 power relay 36.

Figure 3:
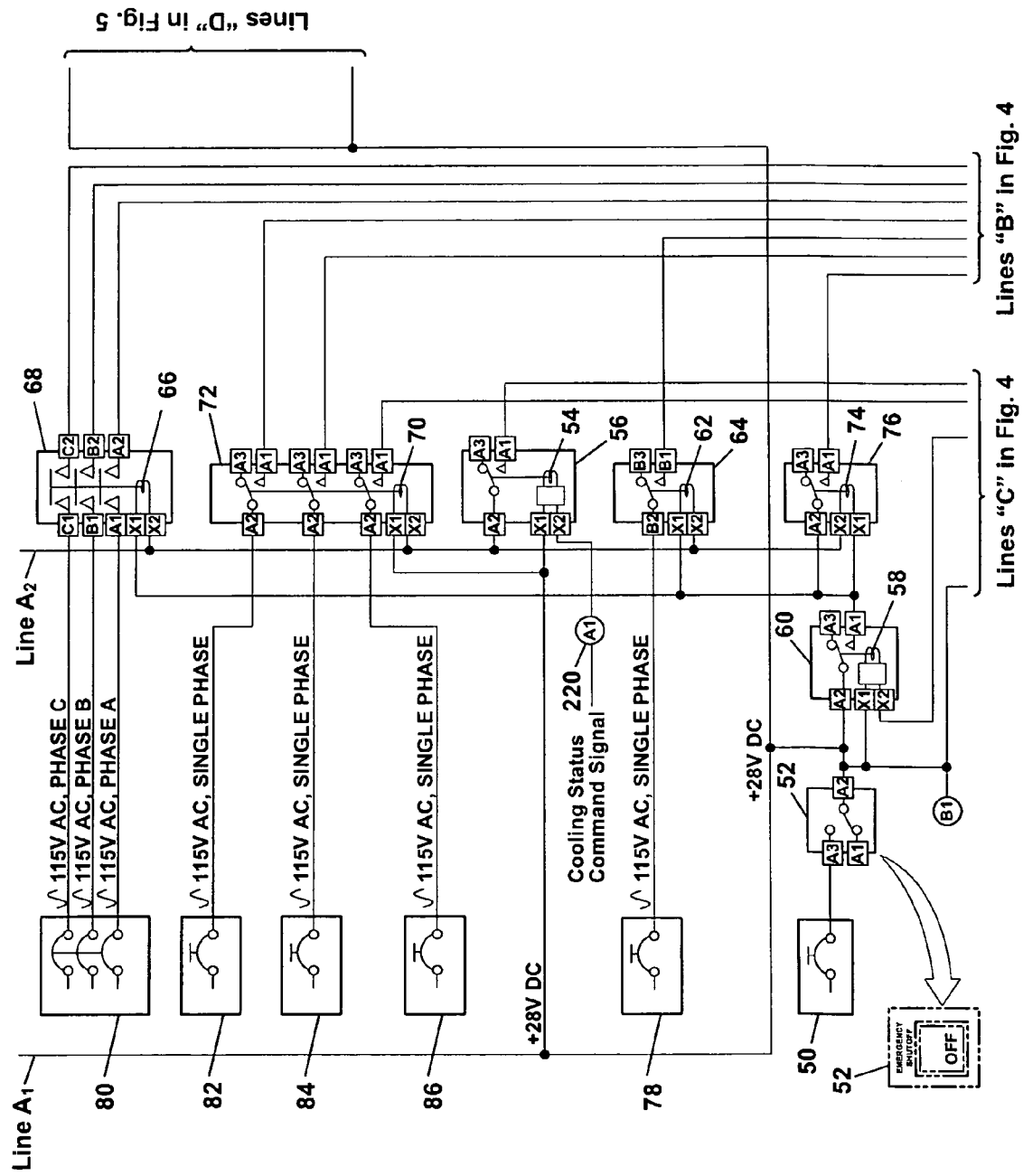
FIG. 3 is a schematic of a power panel and power relay section of a system of the present invention.

In FIG. 3, components are shown which are operable to control an exemplary power distribution for ACSS 10. A +28 volt DC power supply is provided via a DC electrical power panel 50 through an emergency shutoff switch 52. Directly from emergency shutoff switch 52, +28 volt DC power is supplied to a coil 54 of an ECS relay 56. From emergency shutoff switch 52, +28 volt DC power is also supplied to a coil 58 of a first power relay 60, a coil 62 of a second power relay 64, a coil 66 of a third power relay 68, a coil 70 of a fourth power relay 72, and a coil 74 of a fifth power relay 76. 115 VAC, single phase, 400 Hz electrical power is supplied to second power relay 64 from a single phase AC power panel 78. 115 VAC, single phase, 400 Hz electrical power is supplied to each of three connections of third power relay 68 from a three phase AC power panel 80. 115 VAC, single phase, 400 Hz electrical power is supplied to each of three connections of fourth power relay 72 from each of three single phase AC power panels 82, 84 and 86, respectively.

Figure 4:
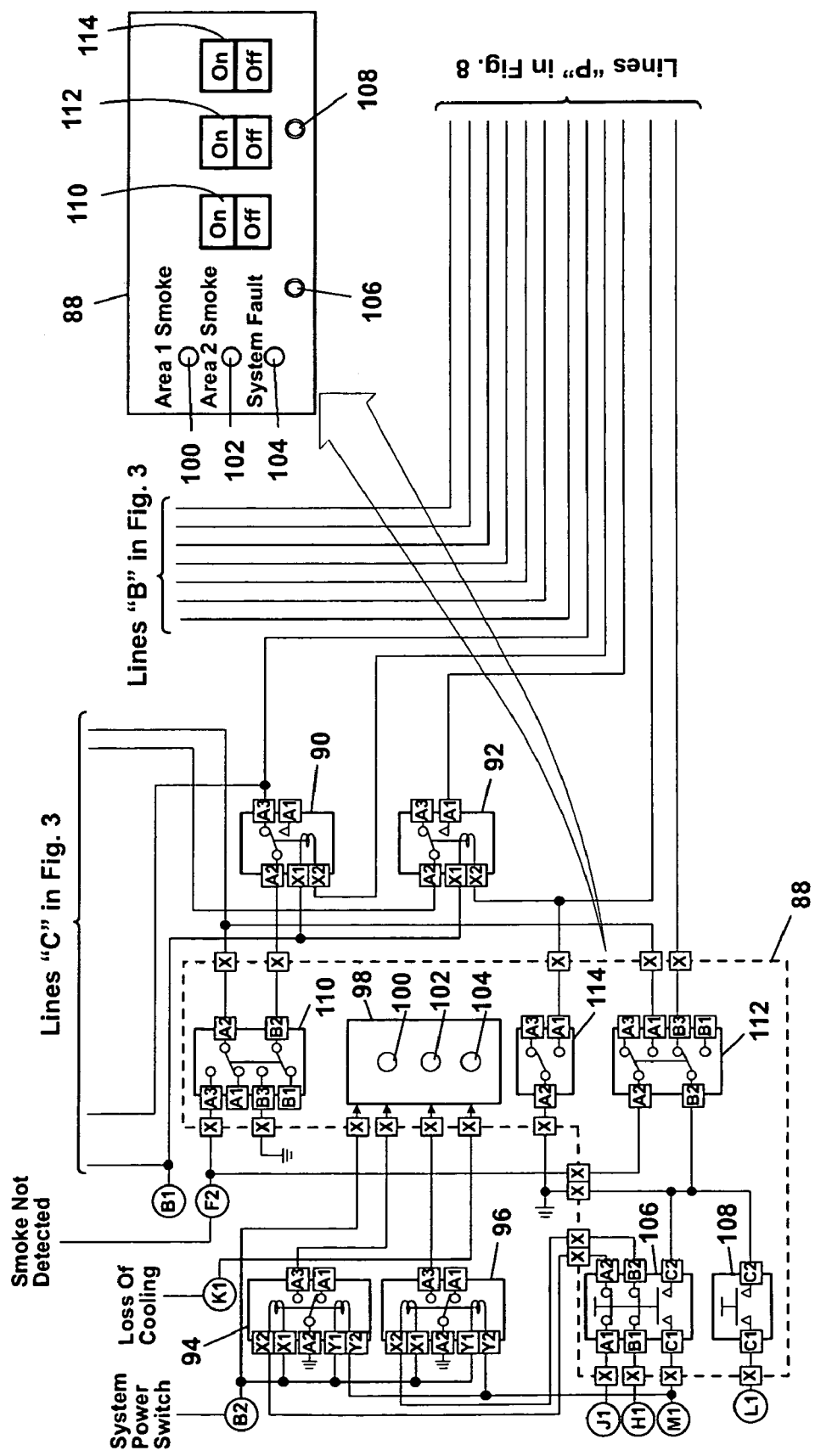
FIG. 4 is a schematic and front elevational view of a cabin power indicator panel of a system of the present invention.

Referring specifically to FIG. 4, components are shown which are associated with smoke detection and indication on a cabin power indicator panel 88. For aircraft applications, cabin power indicator panel 88 is provided in or adjacent to passenger area 14 (shown in FIG. 1) for accessibility by cabin personnel. Cabin power indicator panel 88 is supported by a system #1 power relay 90, and a system #3 power relay 92. In addition, cabin power indicator panel 88 is supported by an AREA 1 smoke inhibit relay 94 and by an AREA 2 smoke inhibit relay 96. Cabin power indicator panel 88 includes an indicator section 98 providing an AREA 1 smoke LED 100, an AREA 2 smoke LED 102 and a system fault LED 104. AREA 1 smoke LED 100 and/or AREA 2 smoke LED 102 illuminate when there is a smoke event, and remain illuminated even when the smoke event ends. AREA 1 smoke LED 100 and/or AREA 2 smoke LED 102 are cleared when: 1) the smoke event has ended and a crew member such as a flight attendant presses a clear indicators momentary switch 106; or 2) the smoke event has ended and a maintenance person presses a cooling test switch 132 (described in reference to maintenance panel 116 below).

Cabin power indicator panel 88 further includes a crew reset momentary switch 108, a system 1 switch 110, a system 2 switch 112, and a system 3 switch 114. Clear indicators momentary switch 106 is pressed to turn off either the AREA 1 smoke LED 100 or the AREA 2 smoke LED 102. If the smoke event is over, the smoke LED(s) remain in an off state, but if a smoke event is still occurring, the appropriate LED(s) will re-illuminate. ACSS 10 is not limited by the number of smoke areas that can be controlled. Crew reset momentary switch 108 provides the capability for a crew member to reset the ACSS 10 system, except for items latched off during a cooling system fault, which will be later described herein. System 1 switch 110, system 2 switch 112, and system 3 switch 114 are exemplary of on/off type switches provided to control individual subsystems (or units) within ACSS 10. Additional switches are used if additional subsystems are used for ACSS 10. Cabin power indicator panel 88 is shown both diagrammatically and in a typical panel configuration in FIG. 4.

Figure 5:
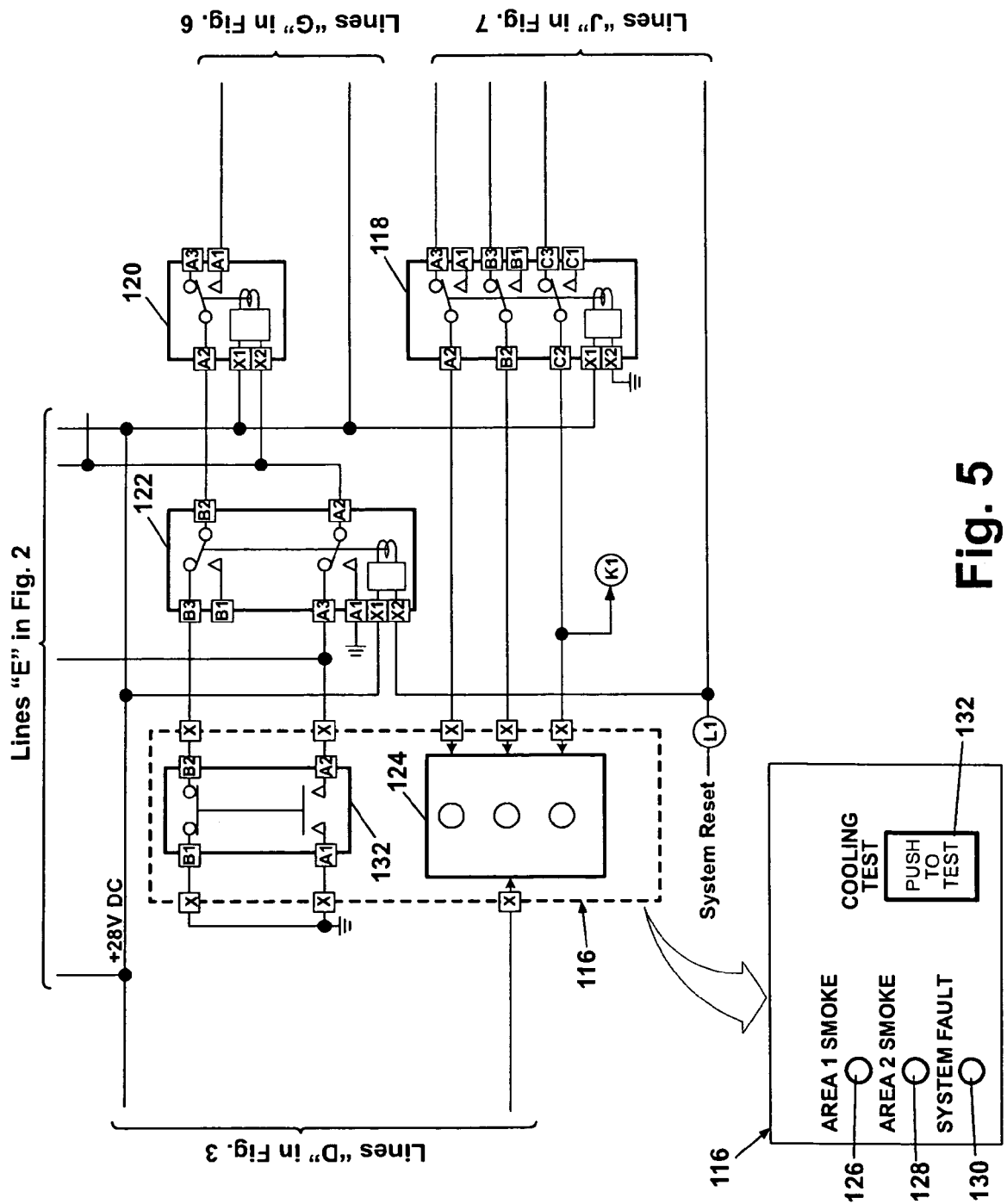
FIG. 5 is a schematic and front elevational view of a maintenance panel and associated components of a system of the present invention.

Referring specifically to FIG. 5, components are shown which are associated with a maintenance panel 116. Maintenance panel 116 is intended for operation only by maintenance personnel and is therefore located in a maintenance accessible area (not shown) of aircraft 12. Maintenance panel 116 is supported by a power-up fault 2 relay 118, an unlatched fault relay 120 and a toggle reset relay 122, whose functions will be later described herein. Maintenance panel 116 includes a maintenance indicator section 124 having an AREA 1 smoke LED 126 and an AREA 2 smoke LED 128, which illuminate during their specified area smoke event and return to an OFF state only when the smoke event clears and a maintenance person presses cooling test switch 132, or a flight crew member cycles system master switch 174 (shown and described in reference to FIG. 7). Maintenance indicator section 124 also includes a system fault LED 130, which illuminates and remains illuminated until maintenance personnel perform appropriate system repair and/or testing. System fault LED 130 illuminates from the same system fault condition (either a smoke event, or for example a cooling fan overheat condition, which generates a cooling system fault) which illuminates system fault LED 104 (shown and described in reference to FIG. 4). Both system fault LEDs 104 and 130, respectively, are only cleared by pressing cooling test switch 132 when the indicator illumination is a result of a fan overheat and may be cleared by either pressing cooling test switch 132 or cycling system master switch 174 following a smoke event. Following a cooling system fault, cooling test switch 132 must be pressed by maintenance personnel following a check and/or repair of a cooling system component, to initiate a cooling system test, prior to returning ACSS 10 to an operating state.

System fault LED 130 is a latched indicator that latches ON if for any reason a smoke event or a cooling system fault occur, or if a smoke detector system test fails. System fault LED 130 remains illuminated, even if ACSS 10 is shut down and later restarted, until cooling test switch 132 is pressed.

Figure 6:
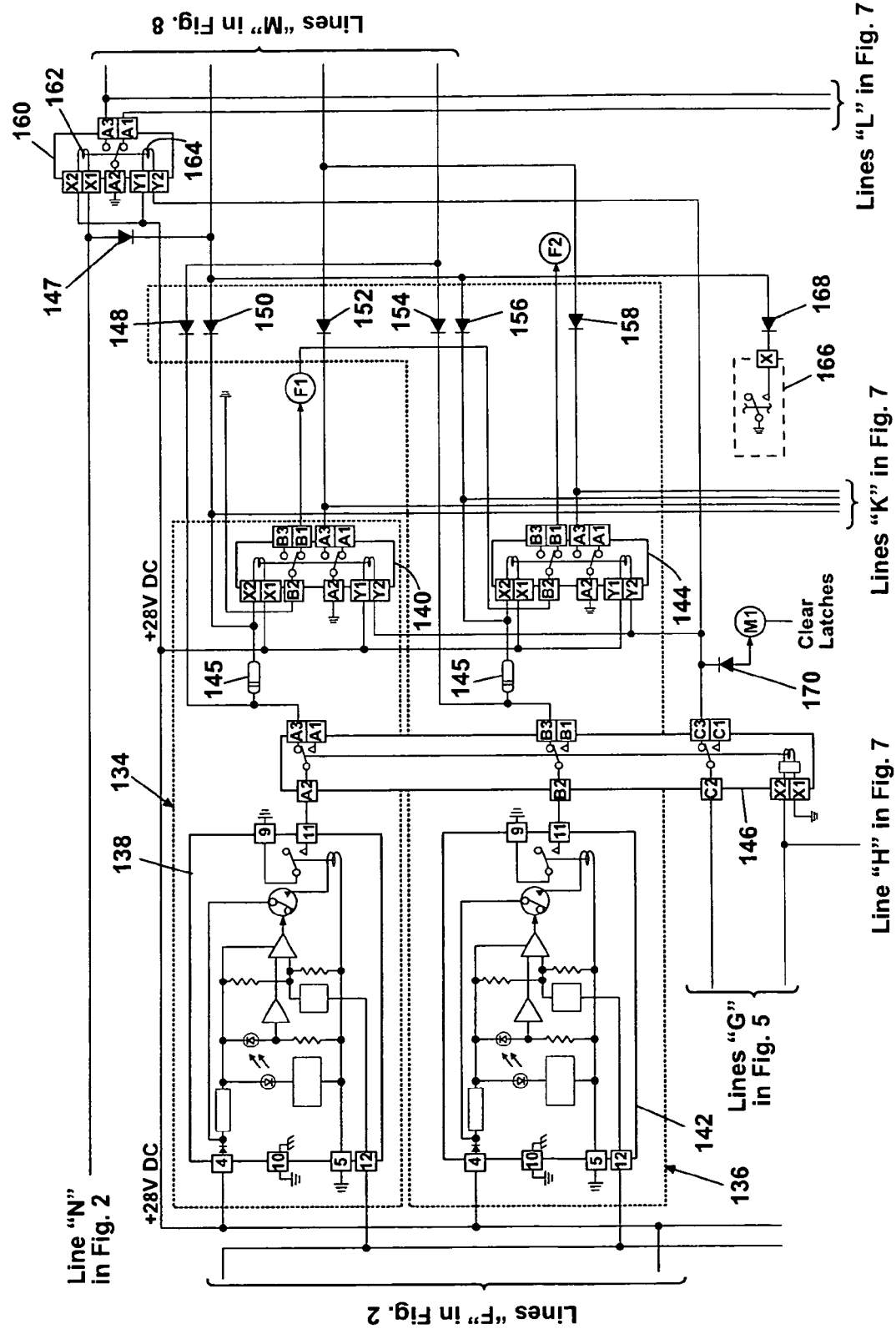
FIG. 6 is a schematic of a smoke detector subsystem pair of a system of the present invention.

Referring next to FIG. 6, a first smoke detector subsystem 134 and an optional second smoke detector subsystem 136, together with supporting components are shown. First smoke detector subsystem 134 (shown within dashed lines), includes a first smoke detector 138 and a latched smoke 1 fault relay 140. Second smoke detector subsystem 136 (also shown within dashed lines), includes a second smoke detector 142 and a latched smoke 2 fault relay 144. A time delay unit 145 (provided for example as a known delay timer unit, an analog delay unit, a time delay printed circuit card, etc.) is provided for each smoke detector subsystem, providing approximately a 2 second signal delay on the output signal from a smoke detector. A power-up fault 1 relay 146 supports both first smoke detector subsystem 134 and second smoke detector subsystem 136. A plurality of isolation diodes 147, 148, 150, 152, 154, 156 and 158 are provided to protect the remaining portion of ACSS 10 from being activated to an incorrect state. A latched cooling fault relay 160 is a magnetic latching relay having two coils 162, 164 to change contacts between normally closed and open states. An existing fire cargo armed system switch 166 is shown in phantom, connected via an isolation diode 168 to smoke event 1 and smoke event 2 signal connections of latched smoke 1 fault relay 140, and latched smoke 2 fault relay 144, respectively. These signal connections provide for a change from a "smoke mode" to a "not smoke mode" switch position of fire cargo armed system switch 166. An isolation diode 170 is also provided to protect remaining portions of ACSS 10 from being activated to an incorrect state.

Figure 7:
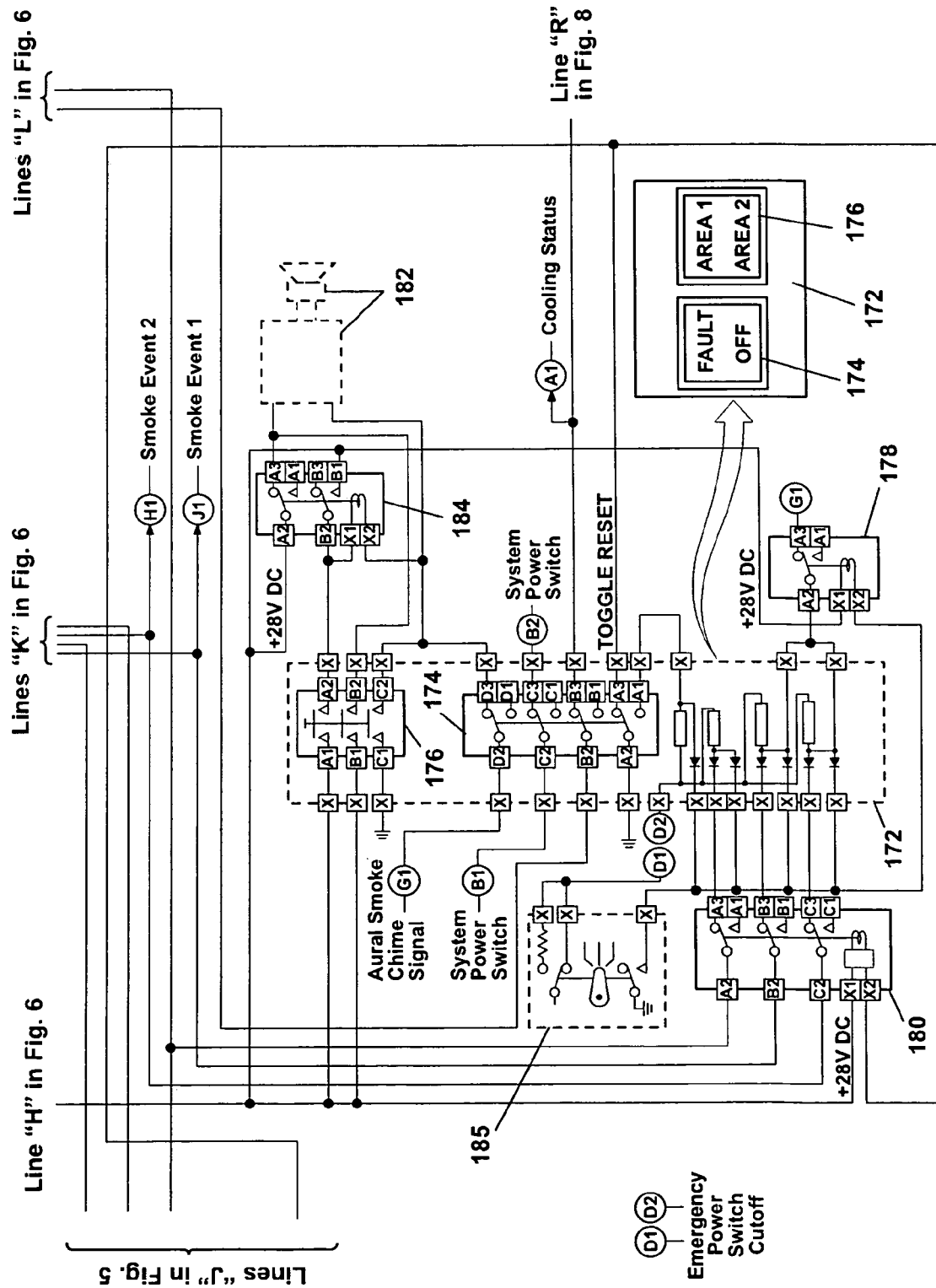
FIG. 7 is a schematic and front elevational view of a flight deck panel and associated components of a system of the present invention.

Referring to FIG. 7, a flight deck panel 172 and associated components are shown both diagrammatically and in panel display form. Flight deck panel 172 is located in flight deck area 16 (shown in FIG. 1) and provides indication and limited control of ACSS 10 features to flight deck personnel. Flight deck panel 172 includes a system master switch 174 and a smoke chime/mute/test switch 176, which also provides illuminating indicators to identify an AREA 1 and/or an AREA 2 smoke event. Flight deck panel 172 is supported by a push to test inhibit relay 178 and a panel inhibit display relay 180. An existing aural smoke alert chime 182 sounds in flight deck area 16 during a smoke event detected by ACSS 10 (in addition to other aircraft 12 smoke detectors) and continues to chime for the duration of the smoke event unless muted by the crew. When flight deck personnel actuate smoke chime/mute/test switch 176, an aural chime mute relay 184 is actuated to mute aural smoke alert chime 182 for the duration of the smoke event. Relay 184 transitions out of the mute state to the normal state when the smoke condition clears. In another preferred embodiment, a "hard" mute, wherein aural chime mute relay 184 is muted regardless of the presence of a smoke event, is provided by flight crew pressing system master switch 174. Flight deck panel 172 is exemplary of an aircraft application and can therefore be changed to accommodate any control area of a mobile platform other than an aircraft.

As an operational example, during an AREA 1 smoke event, both AREA 1 smoke LED 126 and system fault LED 130 on maintenance panel 116 illuminate, both AREA 1 smoke LED 100 and system fault LED 104 of cabin power indicator panel 88 illuminate, the AREA 1 smoke indicator on smoke chime/mute/test switch 176, on flight deck panel 172, illuminates, and fault display 238 (described in reference to FIG. 20 below) on system master switch 174 illuminates. When the smoke event ends (in this example, when smoke clears AREA 1), the following status of indicators results: AREA 1 smoke LED 100, AREA 1 smoke LED 126, system fault LED 130, system fault LED 104 and fault display 238 on system master switch 174 remain illuminated. Each of these indicators remain continuously illuminated and are not turned off until one of the following occurs: 1) a maintenance person takes appropriate action and subsequently presses cooling test switch 132; 2) system master switch 174 is pressed to OFF and then back to ON; or 3) crew reset momentary switch 108 is pressed. The AREA 1 smoke indicator on smoke chime/mute/test switch 176 is the only indicator not illuminated when the smoke event ends. In another preferred embodiment, if the smoke event is identified as being outside of the ACSS 10 system, flight deck crew can cycle system master switch 174, which resets all indicators, including system fault LED 130, system fault LED 104, and fault display 238 of master switch 174, providing the event was a smoke event and not a cooling system fault. A cooling system fault, as noted above, latches certain cooling system controls off, and can only be cleared by maintenance personnel pressing cooling test switch 132, or in this case since it was a smoke event, can be cleared by having the flight crew cycle system master switch 174 or by having the cabin crew press crew reset momentary switch 108.

Figure 8:
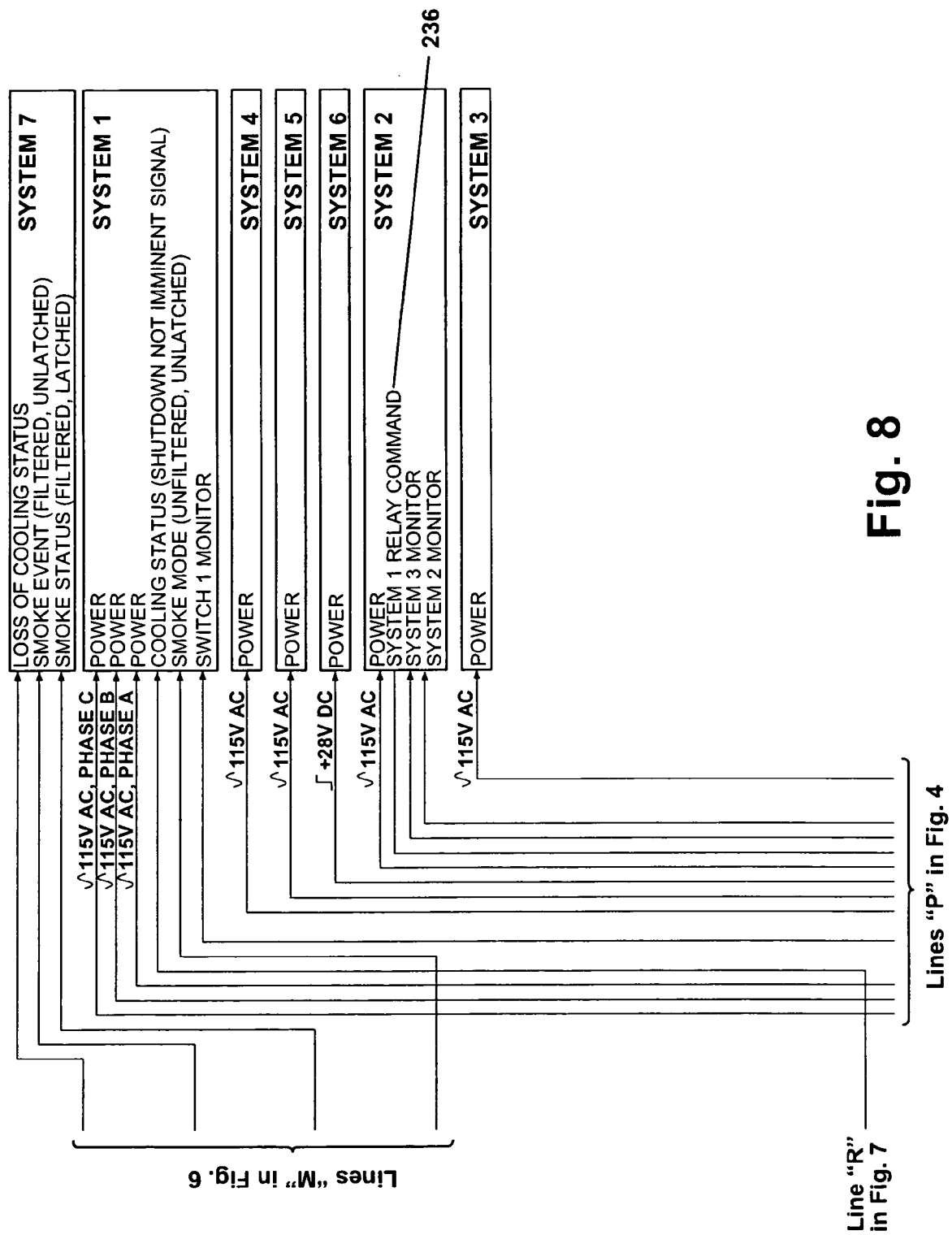
FIG. 8 is an exemplary group of electronic unit systems connectable to a system of the present invention.

Referring to FIG. 8, the various connections of ASCC 10 to each of an exemplary group of seven systems is shown. Both electrical power and/or switch command lines are provided as necessary for each of a SYSTEM #1, a SYSTEM #2, a SYSTEM #3, a SYSTEM #4, a SYSTEM #5, a SYSTEM #6, and a SYSTEM #7. Each system represents one or more electronic units such as communications, entertainment, power amplifier or other similar units requiring cooling air flow.

Figure 9:
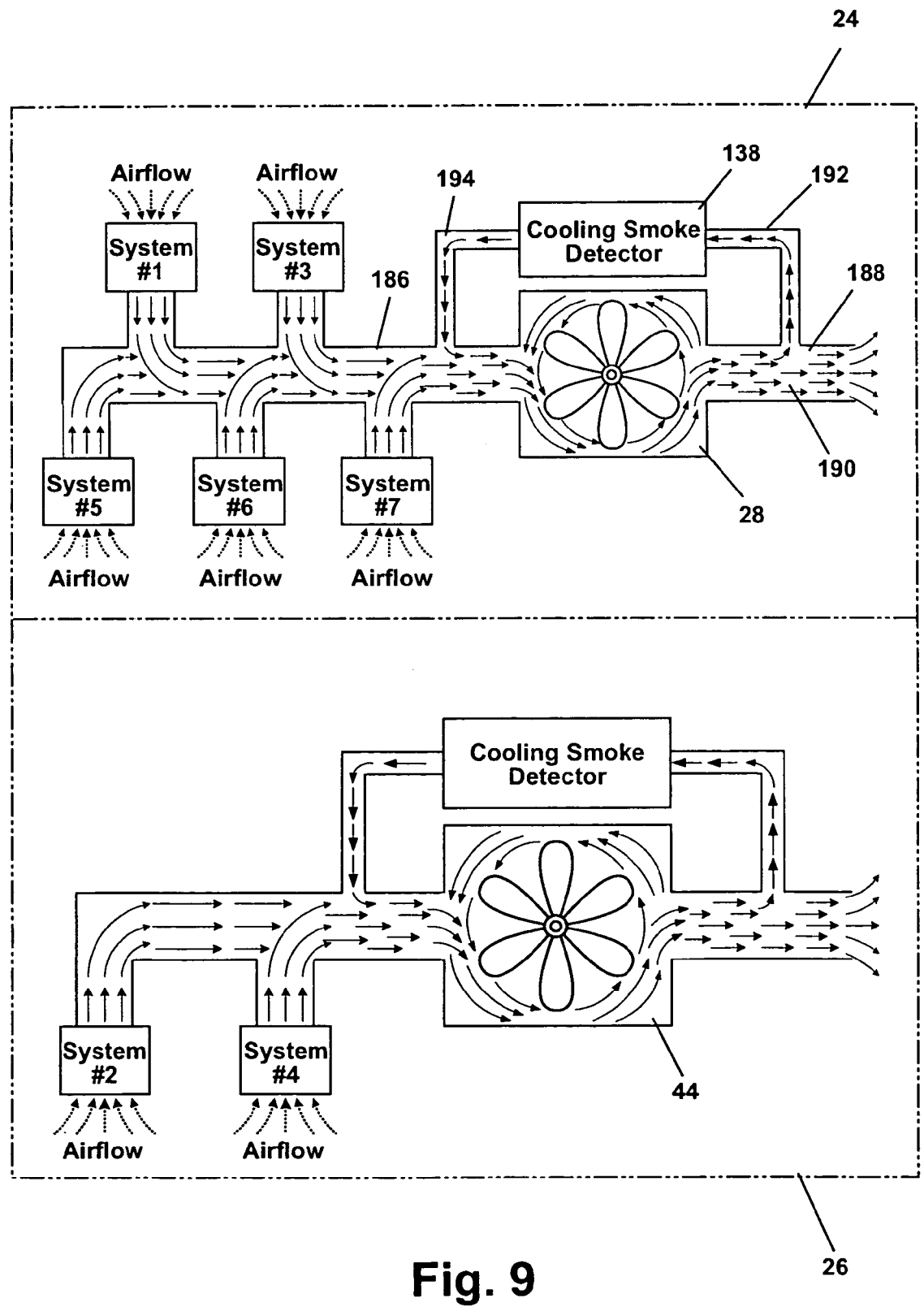
FIG. 9 is a diagrammatic presentation of two exemplary cooling systems and smoke detector sampling paths for a system of the present invention.

As best seen in FIG. 9, a common configuration of ducting for a smoke detector interface with a cooling fan is provided. First and second cooling fan subsystems 24, 26 use cooling fans 28, 44, respectively, to draw air through a plurality of systems, herein labeled systems #1 through #7. Each of systems #1 through #7 are exemplary, and can include communication, entertainment or other electrical units, each requiring its own flow of cooling air. For simplicity, only first cooling fan subsystem 24 will be further described, because second cooling fan subsystem 26 includes similar ducting and flow paths. Air flow enters each of systems #1, 3, 5, 6 and 7 as shown and is collected and combined in a cooling fan supply duct 186. From cooling fan supply duct 186, the combined air volume enters cooling fan 28 and is exhausted through a cooling fan discharge duct 188 as a discharge air volume 190. A portion of discharge air volume 190 is drawn off via a smoke detector supply line 192 and supplied to first smoke detector 138 as sample air. Discharged sample air from first smoke detector 138 is returned to cooling fan supply duct 186 via a smoke detector return line 194. If the sampled portion of discharge air volume 190 contains smoke in a predetermined amount when measured by first smoke detector 138, a smoke event has occurred and an alarm signal is produced by first smoke detector 138. The above description is exemplary. The ACSS 10 is not limited to the smoke detector sampling method described above, but can operate with additional types of available smoke detectors and/or smoke sampling arrangements, including series flow systems or parallel/series flow systems.

Figure 10:
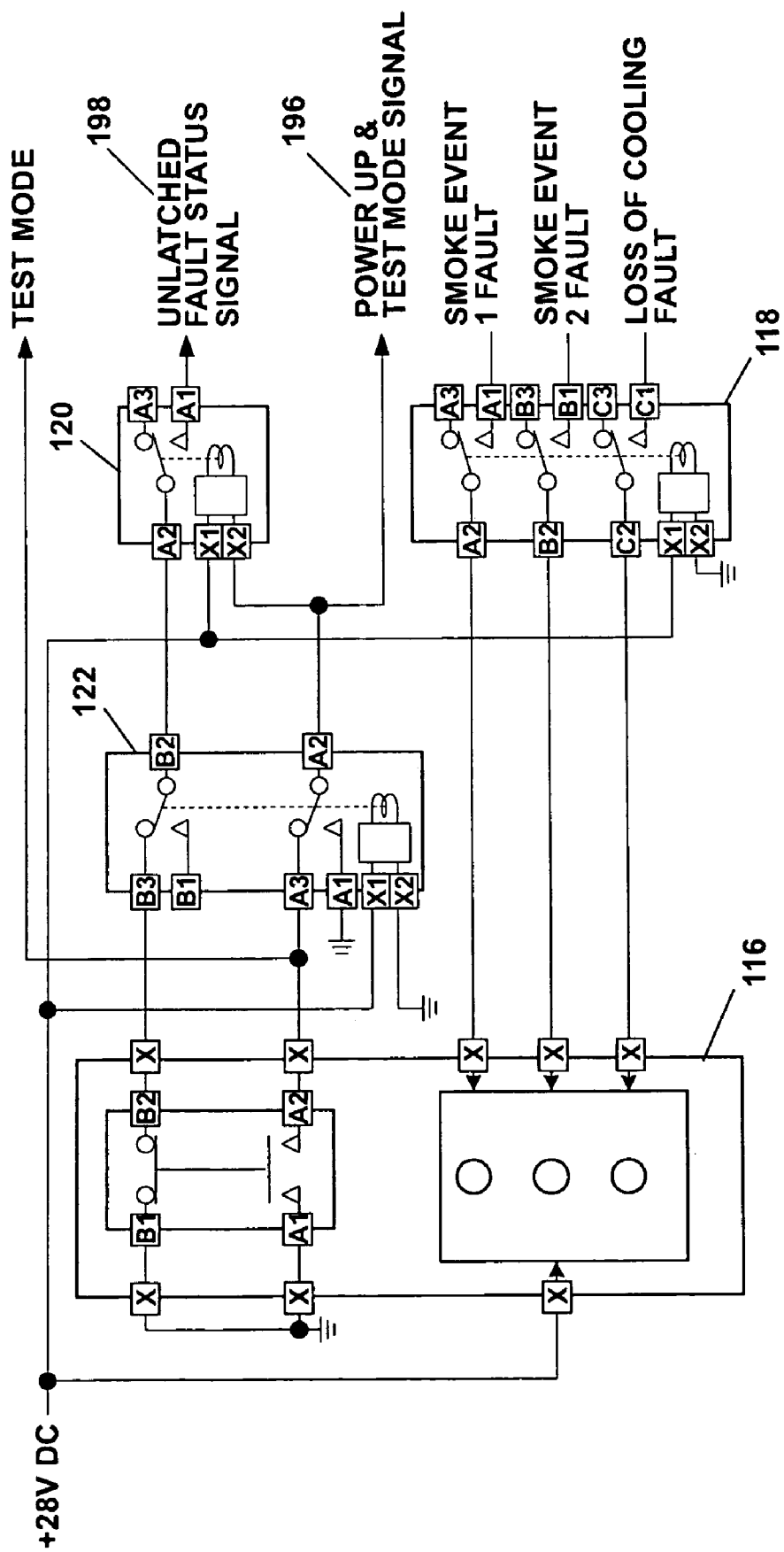
FIG. 10 is a schematic showing signal outputs associated with the maintenance panel of the present invention.

Referring to FIG. 10, when aircraft 12 first applies AC and DC power to the ACSS 10, and system master switch 174 (located in flight deck area 16) is positioned in an "ON" position, toggle reset relay 122 is energized. Toggle reset relay 122 provides a grounded output signal from a pin A2 for 2 seconds, the grounded output signal being identified as a POWERUP & TEST MODE SIGNAL 196. If system master switch 174 is in an "OFF" position, toggle reset relay 122 will not energize when aircraft 12 first applies AC and DC power to ACSS 10.

POWERUP & TEST MODE SIGNAL 196 applies a grounded state to pin X2 of unlatched fault relay 120, a pin X2 of cooling fan overheat fault latch relay 41, a pin X2 of cooling fan overheat fault relay 40, and a pin 12 of the test inputs of both first and second smoke detectors 138, 142, respectively. As long as +28V DC power is available, the coils of these three relays energize immediately, and both first and second smoke detectors 138, 142 are placed in a test mode.

For approximately the next 2 seconds an UNLATCHED FAULT STATUS SIGNAL 198 from unlatched fault relay 120 is not connected to ground. After 2 seconds of time have elapsed, toggle reset relay 122 de-energizes. POWERUP & TEST MODE SIGNAL 196 is thereafter no longer connected to ground, which removes the grounded state of POWERUP & TEST MODE SIGNAL 196 from pin X2 of unlatched fault relay 120, pin X2 of cooling fan overheat fault latch relay 41, pin X2 of cooling fan overheat fault relay 40, and pin 12 of the test inputs of both first and second smoke detectors 138, 142.

After the initial 2 second interval, and for approximately the next 3 seconds, UNLATCHED FAULT STATUS SIGNAL 198 from unlatched fault relay 120 is connected to ground, providing a ground to pins Y2 of latched smoke 1 fault relay 140, latched smoke 2 fault relay 144, and latched cooling fault relay 160. After this 3 second interval of time elapses, unlatched fault relay 120 is de-energized, removing the grounded state on UNLATCHED FAULT STATUS SIGNAL 198. Latched smoke 1 fault relay 140, latched smoke 2 fault relay 144, and latched cooling fault relay 160 remain in a normal mode unless there is a smoke event still present.

In order to manually test any of the smoke detectors in ACSS 10, including exemplary first smoke detector 138 or second smoke detector 142, maintenance personnel are required to press and hold cooling test switch 132 for at least 2 seconds. Once cooling test switch 132 is pressed, unlatched fault relay 120 is immediately energized and remains energized until the maintenance person releases cooling test switch 132. After cooling test switch 132 is released, for approximately a 3 second interval UNLATCHED FAULT STATUS SIGNAL 198 from unlatched fault relay 120 is connected to ground. UNLATCHED FAULT STATUS SIGNAL 198 provides a ground to pins Y2 of latched smoke 1 fault relay 140, latched smoke 2 fault relay 144, and latched cooling fault relay 160. After this 3 second interval of time elapses, unlatched fault relay 120 is de-energized, removing the grounded state on UNLATCHED FAULT STATUS SIGNAL 198. Latched smoke 1 fault relay 140, latched smoke 2 fault relay 144, and latched cooling fault relay 160 will remain in normal mode unless there is a smoke event still present.

In order to manually test any of the cooling fans in ACSS 10, including exemplary cooling fan 28 or cooling fan 44, maintenance personnel must press and hold cooling test switch 132 for at least 1 second. This provides a grounded signal to pin X2 of both cooling fan overheat fault latch relay 41 and cooling fan overheat fault relay 40. Once cooling fan overheat fault relay 40 is energized, the grounded output from pin B3 of cooling fan overheat fault relay 40 is released and cooling fan overheat fault latch relay 41 is energized to its normal mode state.

Figure 11:
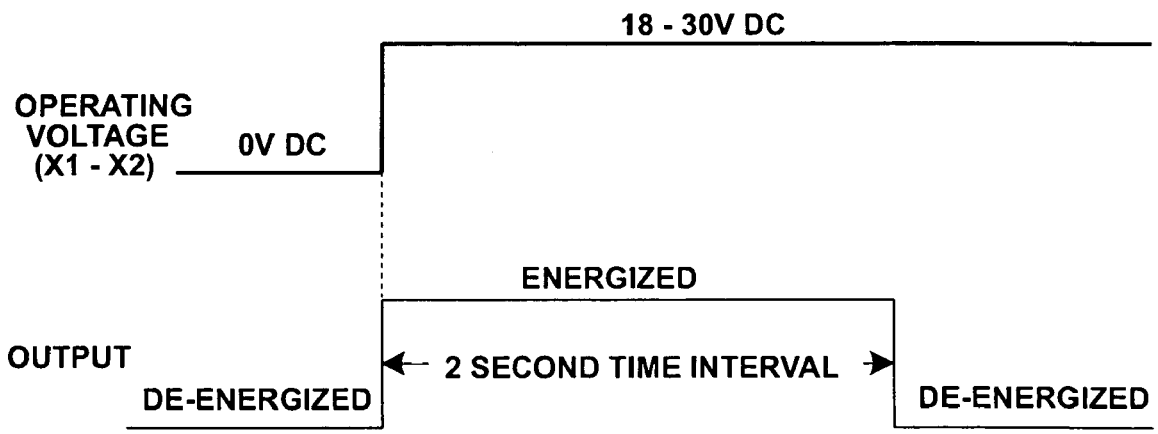
FIG. 11 is a timing diagram identifying a toggle reset relay function of the present invention.

As best seen in FIG. 11, toggle reset relay 122 provides a 2 second (+/−0.5 seconds) pulse signal, with toggle reset relay 122 remaining in an energized state after DC power is applied to ACSS 10. Toggle reset relay 122 is used to test the first and second smoke detector subsystems 134, 136, respectively, after a DC power cycle occurs. When DC power is first applied to ACSS 10, toggle reset relay 122 is immediately energized. After the 2 second interval of time elapses, toggle reset relay 122 is de-energized.

Figure 12:
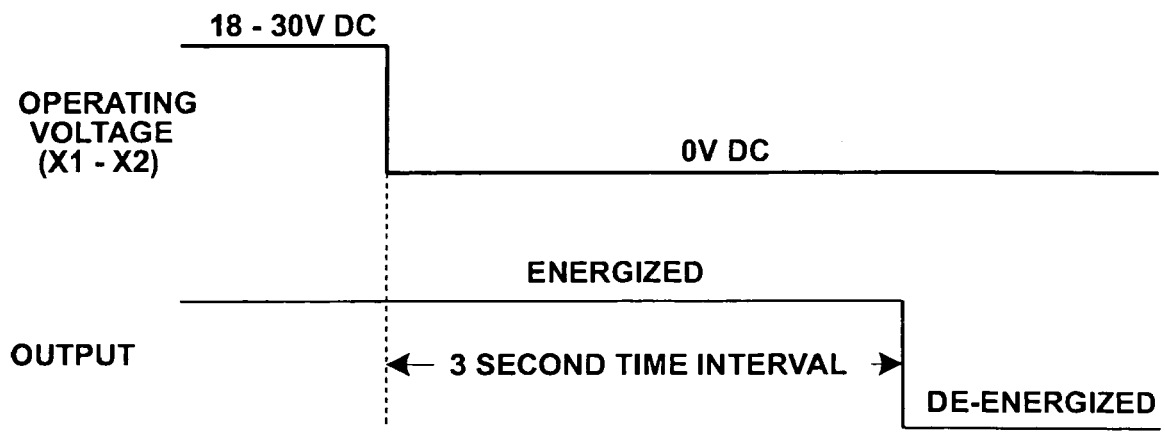
FIG. 12 is a timing diagram identifying a unlatched fault relay function of the present invention.

As best seen in FIG. 12, unlatched fault relay 120 provides a 3 second (+/−0.5 seconds) holdup time, with unlatched fault relay 120 remaining in the energized state, after either an operator has depressed cooling test switch 132 (located on maintenance panel 116), or DC power is removed. When either DC power is first applied to ACSS 10, or toggle reset relay 122 output from pin A2 is grounded, unlatched fault relay 120 is immediately energized. Once the grounded state is removed from pin X2 of unlatched fault relay 120, the de-energized state of unlatched fault relay 120 is delayed for approximately 3 seconds.

Figure 13:
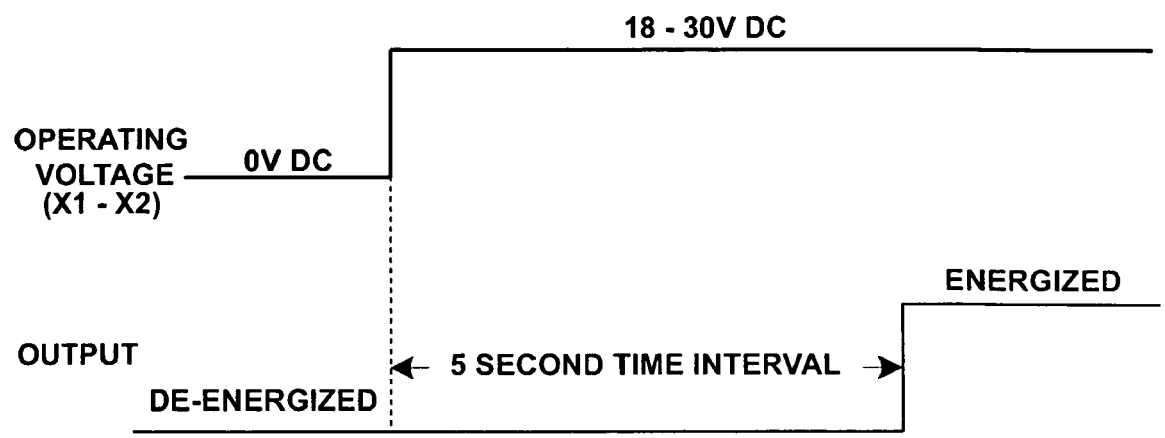
FIG. 13 is a timing diagram identifying a power up fault relay function of the present invention.

As seen in FIG. 13, power up fault 2 relay 118 provides a 5 second (+/−0.5 seconds) delay on the energized state during a DC power up mode of the electrical system. This prevents nuisance faults from appearing during a DC power-up cycle. When power is first applied to Power Up Fault 2 Relay 118, the energized state is delayed for approximately 5 seconds.

Figure 14:
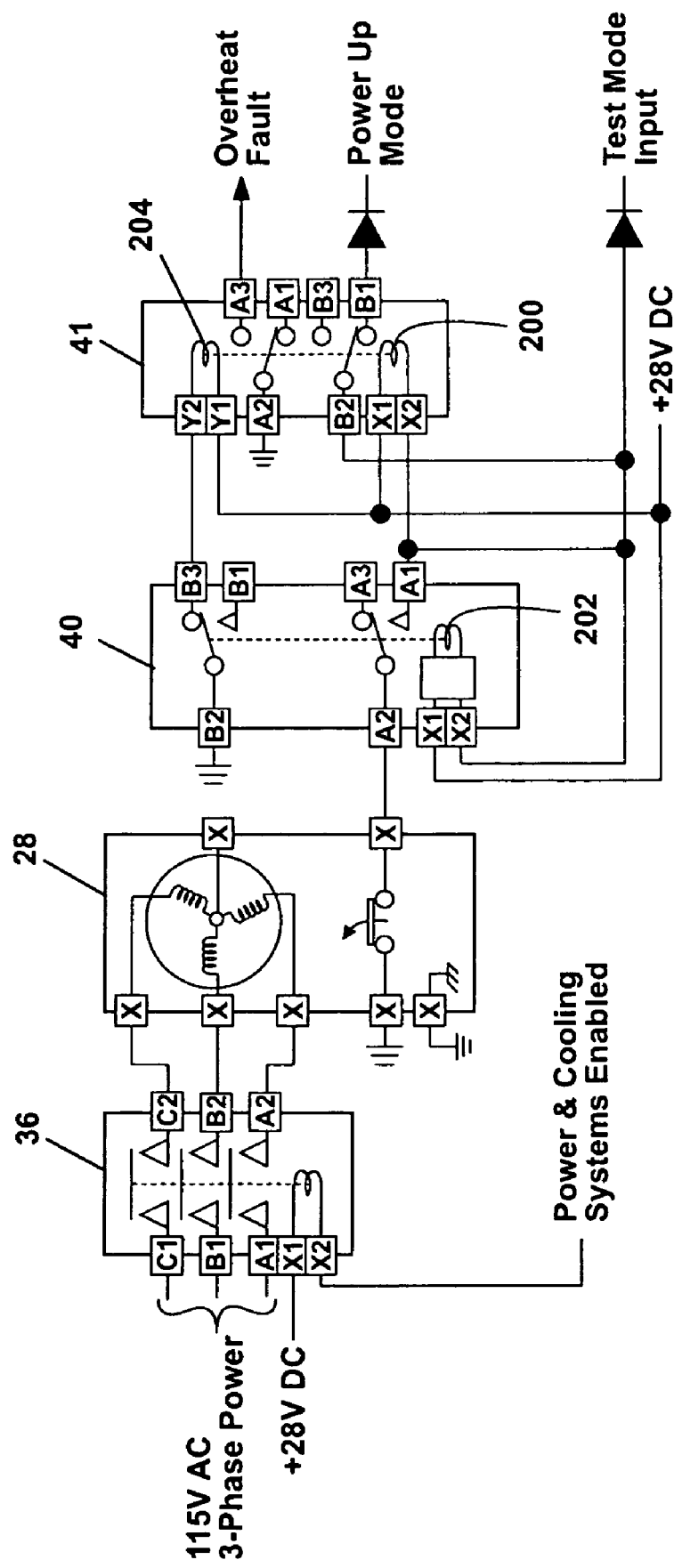
FIG. 14 is a schematic showing signal outputs associated with a cooling system of the present invention.

With reference to FIG. 14, ACSS 10 is designed to meet the following requirement:

If a fan overheat fault condition exists or existed, the cooling system shall be latched in the OFF state and remain powered off until maintenance personnel have investigated and repaired the fault condition and are ready to test the system. Aircraft power cycles of any duration shall not cause a transition of the cooling system from this latched-off state.

The following description initially assumes there is no overheat fault condition for first or second cooling fan subsystems 24, 26, respectively. The following exemplary description is directed to the fan components of first cooling fan subsystem 24, but is also applicable to second cooling fan subsystem 26, (or additional cooling fan subsystems not shown). When aircraft 12 first applies AC and DC power to ACSS 10, toggle reset relay 122 energizes, providing a grounded output signal for approximately 2 seconds to cooling fan overheat fault latch relay 41. Cooling fan overheat fault latch relay 41 passes the grounded signal to pin X2 of cooling fan overheat fault latch relay 41 and to pin X2 of cooling fan overheat fault relay 40. As long as +28V DC power is available, a first coil 200 of cooling fan overheat fault latch relay 41 and a coil 202 of cooling fan overheat fault relay 40 are both energized. Once cooling fan overheat fault relay 40 is energized, the grounded output signal from cooling fan 28 keeps this relay energized until either a cooling fan overheat condition occurs or +28V DC power is removed.

When an overheat condition inside cooling fan 28 occurs, thermal switch 32 inside cooling fan 28 is positioned into an OPEN state, removing the grounded output signal of cooling fan 28. Once the grounded output signal from cooling fan 28 is removed, cooling fan overheat fault latch relay 41 and cooling fan overheat fault relay 40 de-energize. This causes output pin B3 of cooling fan overheat fault relay 40 to be grounded, forcing a second coil 204 of cooling fan overheat fault latch relay 41 to energize. The output pin A3 of cooling fan overheat fault latch relay 41 is grounded (indicating there is an overheat condition of the fan) and this signal is sent to latched cooling fault relay 160. Latched cooling fault relay 160 commands the ACSS 10 to shut down cooling fan 28 (or any operating cooling fan) until maintenance personnel can fix the problem.

After maintenance personnel have fixed the problem, the maintenance person must press cooling test switch 132 to restart cooling fan 28. Pressing cooling test switch 132 provides a grounded signal to pin X2 of cooling fan overheat fault latch relay 41 and cooling fan overheat fault relay 40.

Once cooling fan overheat fault relay 40 is energized, it releases the grounded output from pin B3 of cooling fan overheat fault relay 40 and cooling fan overheat fault latch relay 41 energizes to its normal mode state.

If an overheat condition still exists after the maintenance person has released cooling test switch 132, the output pin B3 on cooling fan overheat fault relay 40 is grounded, forcing second coil 204 of cooling fan overheat fault latch relay 41 to re-energize. The output pin A3 of cooling fan overheat fault latch relay 41 is grounded (indicating there is still an overheat condition of the fan) and this signal is sent to latched cooling fault relay 160. Latched cooling fault relay 160 commands ACSS 10 to shut down the cooling fan(s) until maintenance personnel can fix the problem. The maintenance person must perform another check of the cooling system to determine the problem. If an overheat condition does not exist after the maintenance person has released cooling test switch 132, the grounded output signal (via thermal switch 32) from cooling fan 28 keeps cooling fan overheat fault relay 40 energized until a next overheat condition occurs or until a next +28V DC power cycle. Isolation diodes 42, 43 protect the remaining portion of ACSS 10 from being activated to an incorrect state.

The second cooling fan subsystem 26 relays operate in the same mode as described above. The overheat fault for second cooling fan subsystem 26 is tied to the first cooling fan subsystem 24 overheat fault output as a wired "OR" function. When either of these subsystems indicates an overheat condition, this signal is sent to latched cooling fault relay 160. Latched cooling fault relay 160 commands the ACSS 10 to shut down the cooling fans 28, 44 (or other fans not shown) until maintenance personnel can fix the problem.

Figure 15:
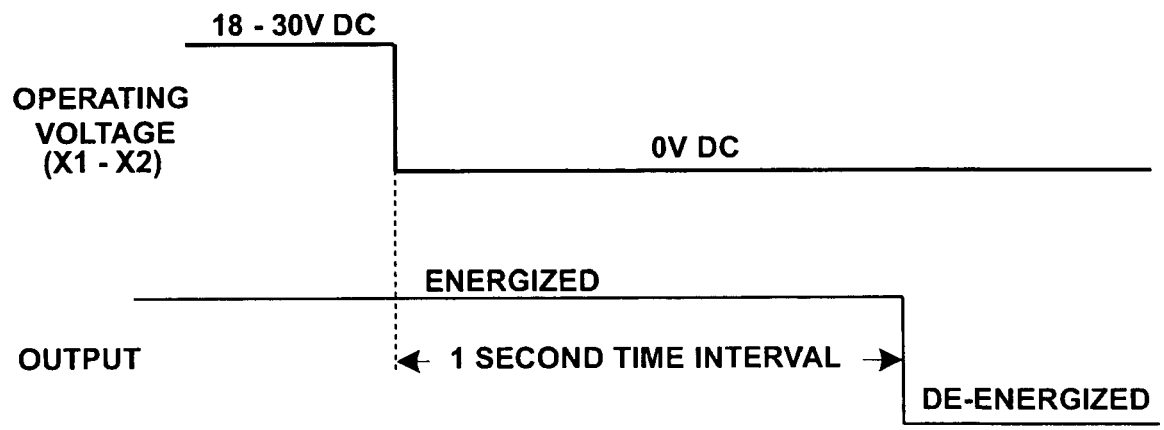
FIG. 15 is a timing diagram identifying a cooling fan overheat fault relay function of the present invention.

As seen in FIG. 15, cooling fan overheat fault relay 40 provides approximately a 1 second (+/−0.5 seconds) holdup time (the relay remains in the energized state) after the grounded output from thermal switch 32 inside cooling fan 28 is removed from pin X2 of cooling fan overheat fault relay 40, or when DC power is removed. If a DC power cycle occurs and there was no overheat fault for cooling fan 28 prior to the power interruption, cooling fan overheat fault relay 40 immediately energizes. Once the grounded state is removed from pin X2 of cooling fan overheat fault relay 40, the de-energized state of this relay is delayed for 1 second. After the overheat fault is repaired, maintenance personnel can restart the cooling system by pressing cooling test switch 132 to energize cooling fan overheat fault relay 40.

Cooling fan overheat fault latch relay 41 is a latching relay. This relay is used to provide a latched overheat fault when thermal switch 45 inside cooling fan 44 (shown in FIG. 2) indicates an open state for longer than one second. Once cooling fan overheat fault latch relay 41 is commanded to the faulted condition, it will remain latched (even if power is removed) until a test of the electrical system has been performed by an operator.

Power up inhibit relay 38 (shown in FIG. 1) is used to prevent nuisance faults from appearing during power up. Power up inhibit relay 38 provides approximately a 2 second (+/−0.5 seconds) delay when +28 VDC power is applied to ACSS 10. This prevents nuisance faults from appearing during a power up cycle. When power is first applied to power up inhibit relay 38, it will not energize for an interval of at least 2 seconds.

Figure 16:
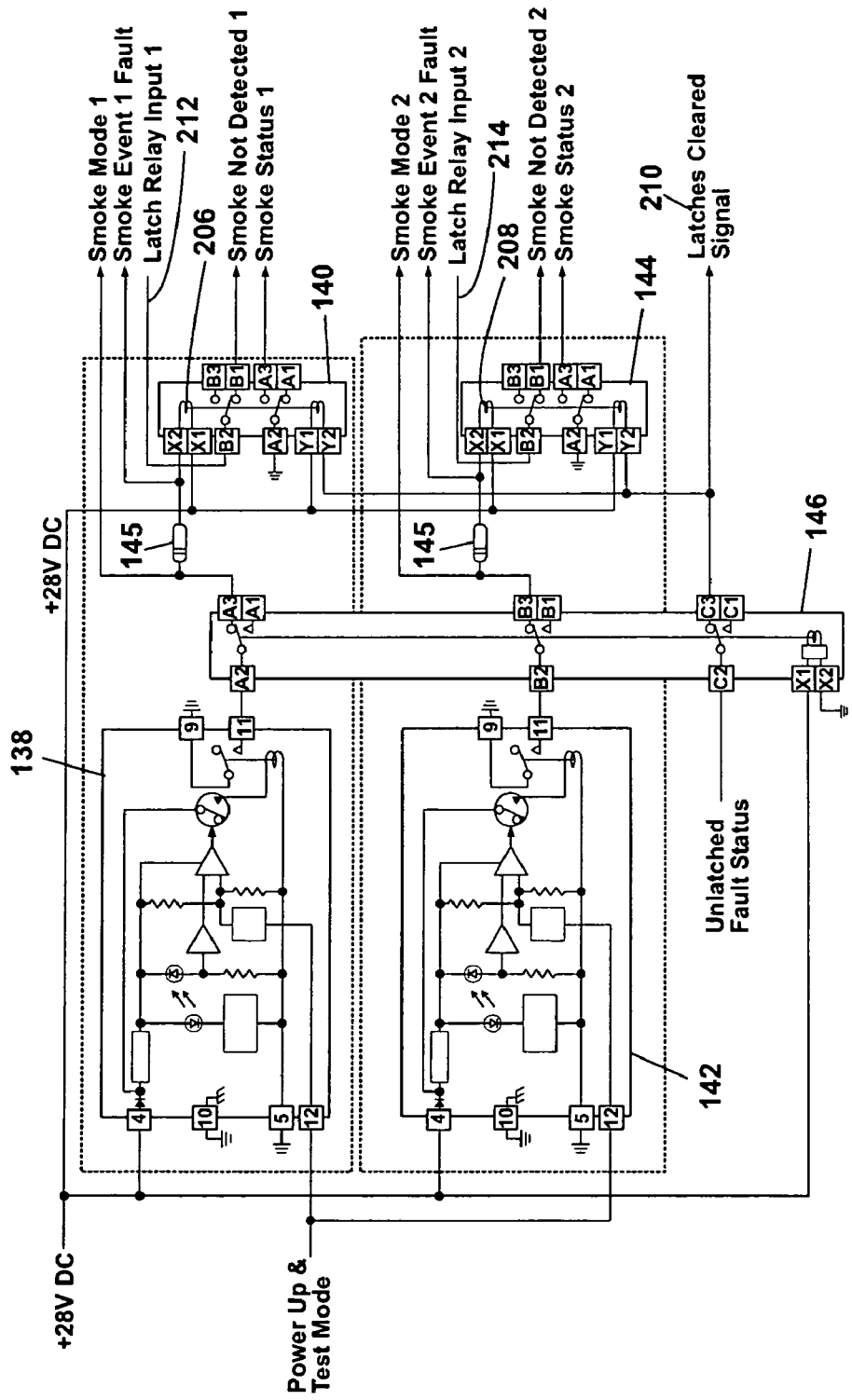
FIG. 16 is a schematic showing signal outputs associated with a smoke event of the smoke detectors of the present invention.

Referring to FIG. 16, ACSS 10 is also designed to meet the following requirement:

If a smoke detected condition exists, the cooling system and power to the electronic units will be latched in the OFF state.

The description below assumes there is no smoke event fault condition for the cooling subsystems. If there is a power cycle of ACSS 10, or emergency shutoff switch 52 (located in flight deck area 16), transitions from an OFF position to an ON position, toggle reset relay 122 (shown in FIG. 5) applies a grounded state (POWERUP & TEST MODE SIGNAL 196) to pin 12 of the test inputs of both first and second smoke detectors 138, 142, respectively. As long as +28V DC power is available, first and second smoke detectors 138, 142 are placed in test mode. At the same time, power up fault 1 relay 146 energizes, creating an open circuit between first smoke detector 138 and latched smoke 1 fault relay 140, or between second smoke detector 142 and latched smoke 2 fault relay 144. This reduces the likelihood of nuisance smoke event faults from appearing during a power up mode of ACSS 10. Power up fault 1 relay 146 provides an energized pulse signal for a duration of approximately 5 seconds. After the 5 second duration elapses, power up fault 1 relay 146 de-energizes, providing continuity between the first and second smoke detectors 138, 142 and latched smoke fault relays 140, 144, respectively.

If a smoke event has occurred, internal sensors (for example photo sensors) inside first or second smoke detectors 138, 142, via an output signal command the output at pin 11 to connect to ground, creating a smoke fault condition. The output signal is identified as SMOKE MODE 1 for first smoke detector 138 and SMOKE MODE 2 for second smoke detector 142. ACSS 10 provides a "persistence delay" to minimize false smoke detection/alarms potentially caused by moisture, dirt, etc., in a smoke detector. The persistence delay is approximately two (2) seconds and requires either of the SMOKE MODE 1 or 2 signals be in a grounded state for longer than approximately 2 seconds. After this 2 second interval, a pair of time delay units 145 (provided for example as a known delay timer unit or as an analog delay unit) passes the grounded state to either latched smoke 1 fault relay 140 or latched smoke 2 fault relay 144, respectively. The output signal of time delay unit 145 is identified as either a SMOKE EVENT 1 FAULT or SMOKE EVENT 2 FAULT. The SMOKE EVENT 1 FAULT signal provides a ground to pin X2 and energizes a primary coil 206 of latched smoke 1 fault relay 140. The SMOKE EVENT 2 FAULT signal provides a ground to pin X2 and energizes a primary coil 208 of latched smoke 2 fault relay 144. A SMOKE NOT DETECTED 1 or a SMOKE NOT DETECTED 2 signal transfers from a grounded state to an OPEN state. Conversely, a SMOKE STATUS 1 or a SMOKE STATUS 2 signal transfers from an OPEN state to a grounded state.

Latched smoke 1 fault relay 140 and latched smoke 2 fault relay 144 are latching relays. Once either relay is commanded to the smoke fault (mode) condition, it will remain latched, even if power is removed, until there is no smoke in either first or second smoke detectors 138 or 142 and a test of the electrical system is performed by an operator, or there is a DC power cycle of ACSS 10.

In order to test any of the first or second smoke detectors 138 or 142 (or additional smoke detectors not shown) in ACSS 10, maintenance personnel must press and hold cooling test switch 132 for longer than 2 seconds. After cooling test switch 132 is pressed, unlatched fault relay 120 is immediately energized and remains energized until maintenance personnel release cooling test switch 132. After cooling test switch 132 is released, for a next 3 second interval, UNLATCHED FAULT STATUS SIGNAL 198 from unlatched fault relay 120 is connected to ground. UNLATCHED FAULT STATUS SIGNAL 198 is connected directly to power up fault 1 relay 146. Providing there is no power cycle during this test, an output signal, identified as LATCHES CLEARED SIGNAL 210 of power up fault 1 relay 146 is connected to ground. LATCHES CLEARED SIGNAL 210 provides a ground to pins Y2 of both latched smoke 1 fault relay 140 and latched smoke 2 fault relay 144. After the 3 second interval of time elapses, unlatched fault relay 120 de-energizes, removing the grounded state on LATCHES CLEARED SIGNAL 210. Latched smoke 1 fault relay 140 or latched smoke 2 fault relay 144 remain in a normal mode unless there is a smoke event still present. A latch relay input 1 line 212 to latched smoke 1 fault relay 140 and a latch relay input 2 line 214 to latched smoke 2 fault relay 144 are connected to ground. In another preferred embodiment, these input lines are connected to other individual sources. Examples are a power source (+V DC) or to an LRU with an output discrete circuit (not shown).

Power up fault 2 relay 118 delays faults for approximately 5 seconds after a power cycle occurs in ACSS 10. This prevents nuisance faults from appearing during an ACSS power-up mode. After the 5 second time elapses, power up fault 2 relay 118 energizes and provides continuity to appropriate ACSS 10 indicators.

Figure 17:
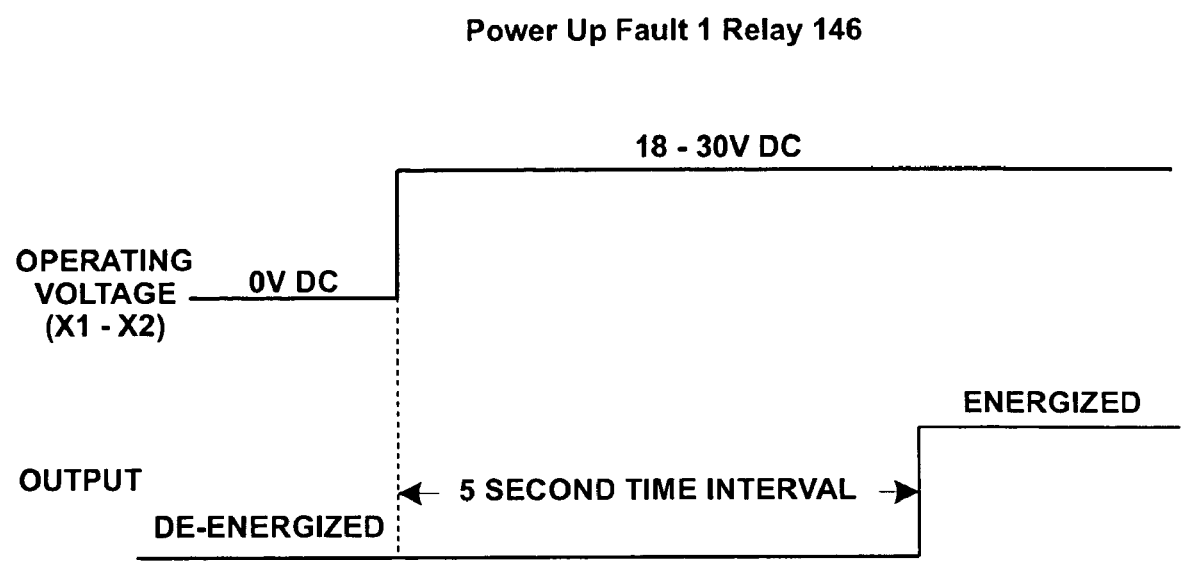
FIG. 17 is a timing diagram identifying a power up fault relay function of the present invention.

As best seen in FIG. 17, power up fault 1 relay 146 provides a 5 second (+/−0.5 seconds) delay on the energized state during a DC power-up mode of the electrical system. This prevents nuisance faults from appearing during a DC power-up cycle. When power is first applied to power up fault 1 relay 146, the energized state is delayed for approximately 5 seconds.

Latched smoke 1 fault relay 140 is a latching relay. This relay reacts to a latched smoke event when smoke is detected from first smoke detector 138. After latched smoke 1 fault relay 140 is commanded to the faulted condition, it remains latched (even if power is removed) until a manually initiated cooling test is performed by pressing cooling test switch 132.

Latched smoke 2 fault relay 144 is also a latching relay. Latched smoke 2 fault relay 144 reacts to a latched smoke event when smoke is detected from second smoke detector 142. After latched smoke 2 fault relay 144 is commanded to the faulted condition, it remains latched, even if power is removed, until a manually initiated cooling test is performed by pressing cooling test switch 132.

Figure 18:
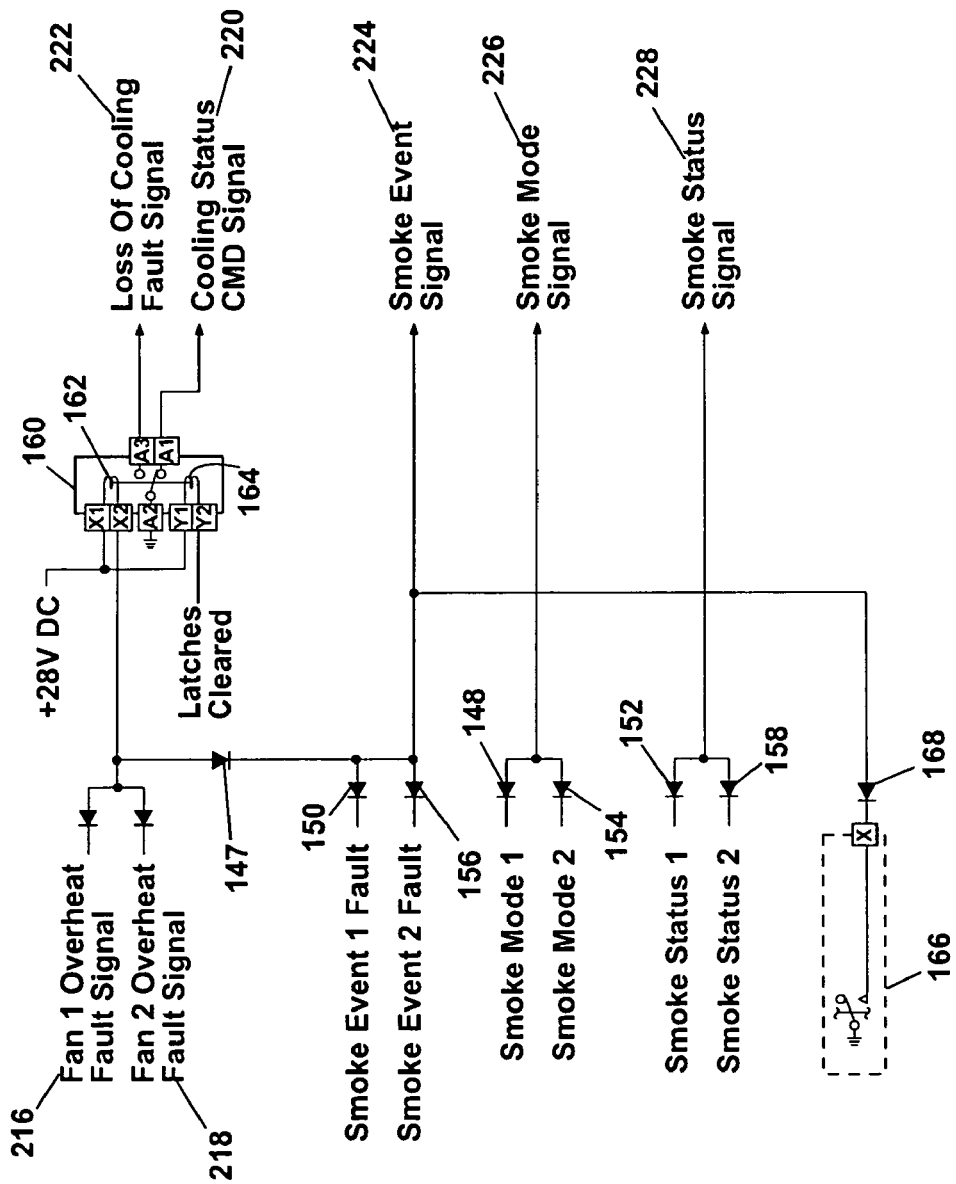
FIG. 18 is a schematic showing signal outputs associated with a smoke event and a cooling system fault resulting in a loss of cooling system operation for a system of the present invention.

Referring next to FIG. 18, if an overheat condition inside one of the cooling fans 28, 44 exists, either thermal switch 32 or 45, respectively, inside the appropriate fan is positioned in an OPEN state. After the grounded output signal from the appropriate fan(s) is removed, cooling fan overheat fault latch relay 41 and cooling fan overheat fault relay 40 are de-energized, causing output pin B3 on cooling fan overheat fault relay 40 to be grounded and forcing second coil 204 (shown in FIG. 14) on cooling fan overheat fault latch relay 41 to energize. Output pin A3 on cooling fan overheat fault latch relay 41 is grounded (indicating there is an overheat condition of the fan(s)) and this signal (identified as a FAN 1 OVERHEAT FAULT SIGNAL 216 or a FAN 2 OVERHEAT FAULT SIGNAL 218) is sent to latched cooling fault relay 160. Latched cooling fault relay 160 commands a COOLING STATUS COMMAND SIGNAL 220 to an OPEN state and a LOSS OF COOLING FAULT SIGNAL 222 to a grounded state. Latched cooling fault relay 160 commands ACSS 10 to shut down the cooling fan(s) until maintenance personnel can fix the problem.

As previously noted herein, if there is a smoke event in either of the first or second cooling fan subsystems 24, 26, internal sensors inside either first or second smoke detector 138, 142 command the output at pin 11 to be connected to ground. This signal is identified as either SMOKE MODE 1 or SMOKE MODE 2. If SMOKE MODE 1 or SMOKE MODE 2 is in a grounded state for longer than 2 seconds, the pair of time delay units 145 pass the grounded state to latched smoke 1 fault relay 140 or latched smoke 2 fault relay 144, respectively.

SMOKE EVENT 1 and SMOKE EVENT 2 are two filtered, unlatched, smoke detector output signals that are diode "OR" tied together, creating a single SMOKE EVENT SIGNAL 224. SMOKE EVENT SIGNAL 224 can be used by other electronic units for indication of a smoke event in either first or second cooling fan subsystem 24 or 26, respectively. SMOKE MODE 1 and SMOKE MODE 2 are two unfiltered, unlatched, smoke detector output signals that are diode "OR" tied together, creating one SMOKE MODE SIGNAL 226. SMOKE MODE SIGNAL 226 can be used by other electronic units for indication of raw smoke data in either first or second cooling fan subsystem 24 or 26, respectively. SMOKE STATUS 1 and SMOKE STATUS 2 are two filtered, latched, smoke detector output signals that are diode "OR" tied together, creating one SMOKE STATUS SIGNAL 228. SMOKE STATUS SIGNAL 228 can be used by other electronic units for indication of a latched smoke event in either first or second cooling fan subsystem 24 or 26, respectively.

Latched cooling fault relay 160 is a latching relay. Latched cooling fault relay 160 provides a LOSS OF COOLING status when either an overheat condition of the cooling fan(s) occurs, or a smoke event is detected from either of the first or second smoke detectors 138, 142. After latched cooling fault relay 160 is commanded to the faulted condition, it will remain latched (even if power is removed) until a test of the electrical system is performed by an operator.

Figure 19:
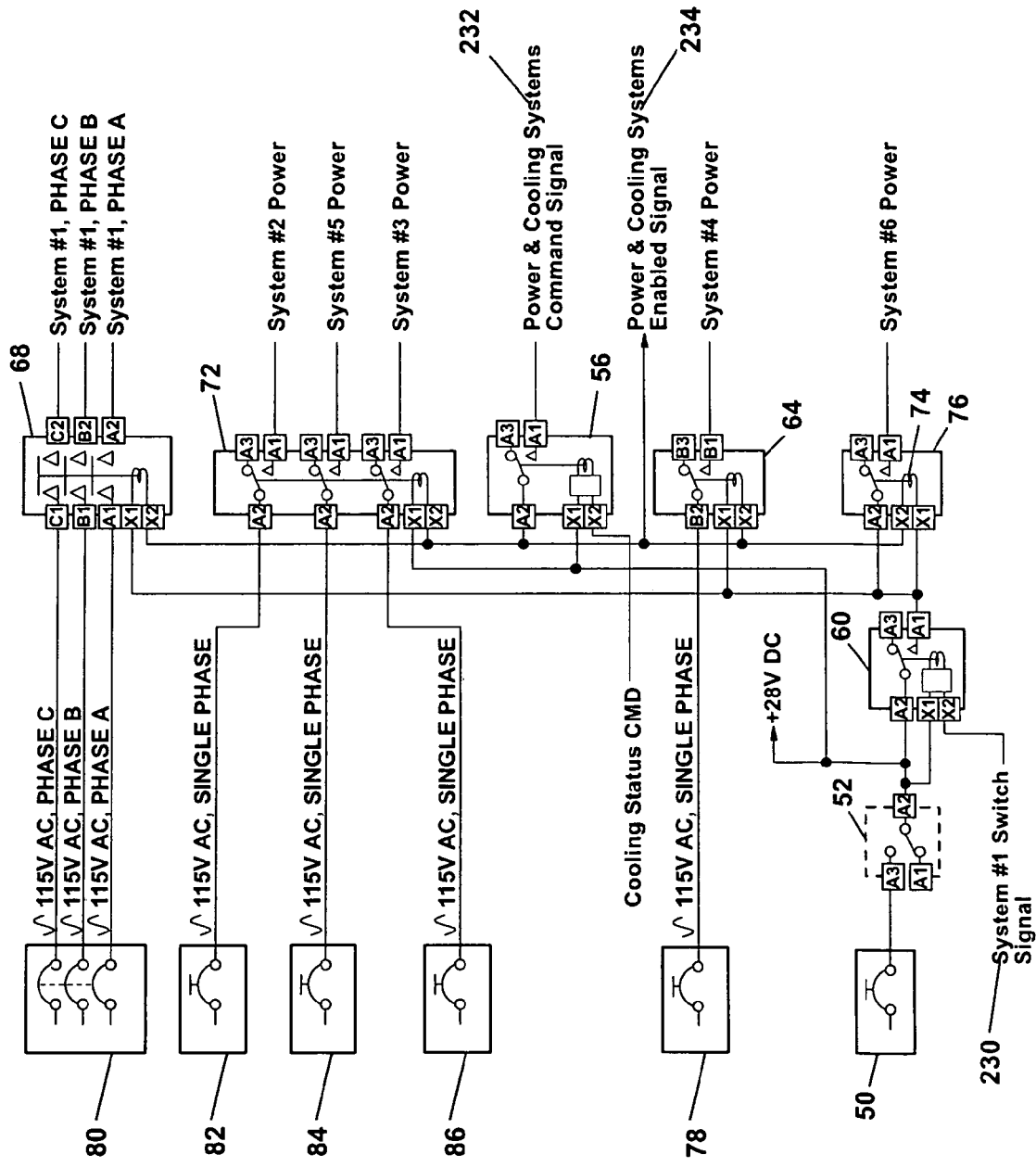
FIG. 19 is a schematic showing signal and power outputs associated with the power distribution system of the present invention.

Referring to FIGS. 3 and 19, emergency shutoff switch 52 is an existing switch located in flight deck area 16. If emergency shutoff switch 52 is placed in an OFF position, +28V DC power is isolated from ACSS 10. If emergency shutoff switch 52 is placed in an ON position, +28V DC power is supplied to ACSS 10. First power relay 60 receives +28V DC power from emergency shutoff switch 52. A SYSTEM 1 SWITCH SIGNAL 230 is provided from first power relay 60. If SYSTEM 1 SWITCH SIGNAL 230 provides a grounded state, then first power relay 60 immediately supplies +28V DC power to a high side of both second power relay 64 and third power relay 68. Second power relay 64 and third power relay 68 both immediately energize, supplying AC power to those electrical units connected. If SYSTEM 1 SWITCH SIGNAL 230 provides an open state, first power relay 60 does not remove the +28V DC power from the high side of second power relay 64 and third power relay 68 for a total interval of approximately 8 seconds. After the 8 second interval elapses, second power relay 64 and third power relay 68 both de-energize, and AC output power is isolated from those electrical units connected.

ECS relay 56 is supplied with +28V DC power after emergency shutoff switch 52 is placed in the ON position. The COOLING STATUS COMMAND SIGNAL 220 is provided from system master switch 174. When system master switch 174 is placed in an ON position and there are no faults in ACSS 10, COOLING STATUS COMMAND SIGNAL 220 provides a grounded state to ECS relay 56. ECS relay 56 energizes immediately and allows the status of a POWER & COOLING SYSTEMS COMMAND SIGNAL 232 to pass through. If system master switch 174 is placed in an OFF position, or there is either a smoke event, or an overheat condition of one of the fans, COOLING STATUS COMMAND SIGNAL 220 provides an open state to ECS relay 56. An 8 second timer located inside ECS relay 56 is activated. After an interval of 8 seconds, ECS relay 56 de-energizes and all AC power relays immediately de-energize. A POWER & COOLING SYSTEMS ENABLED SIGNAL 234 is the output of ECS relay 56 which is sent to cooling system fan 1 power relay 36 and cooling system fan 2 power relay 48.

First power relay 60 provides an 8 second (+/−0.5 seconds) holdup time (first power relay 60 staying in the energized state) after the grounded output signal from first power relay 60 is removed from pin X2 of first power relay 60 or when DC power is removed. First power relay 60 provides DC power to second power relay 64 and third power relay 68. First power relay 60 allows for a graceful power-down of SYSTEM #1, SYSTEM #3, SYSTEM #4, SYSTEM #5, and SYSTEM #6. The specific time delay for first power relay 60 can be increased or decreased as necessary to meet specific ACSS 10 requirements for shutdown.

The energized state of first power relay 60 is immediate when DC power is applied to ACSS 10, system 1 switch 110 is in an "ON" position, and a SYSTEM #1 RELAY COMMAND 236 (shown in FIG. 8) output signal from SYSTEM #2 is "High" (open state). The de-energized state of first power relay 60 is delayed by 8 seconds when either DC power is removed from ACSS 10, or system 1 switch 110 is placed in the "OFF" position, or the SYSTEM #1 RELAY COMMAND 236 output signal from SYSTEM #2 is activated to "Low" (grounded state).

Power Relay #2 provides 115V AC, single phase, 400 Hertz power to SYSTEM #4. The energized state of this relay is defined as when DC power is applied to ACSS 10, there is no smoke event, there is no cooling fan overheat condition, and either system 1 switch 110 or system 2 switch 112 is in the "ON" state.

Third power relay 68 provides 115V AC, three phase, 400 Hertz power to SYSTEM #1. The energized state of this relay is defined as when DC power is applied to ACSS 10, there is no smoke event, there is no cooling fan overheat condition, and either system 1 switch 110 or system 2 switch 112 is in the "ON" state.

Fourth power relay 72 provides 115V AC, single phase, 400 Hertz power to SYSTEM #2, SYSTEM #3, and SYSTEM #4. The energized state of this relay is defined as when DC power is applied to ACSS 10, there is no smoke event, there is no cooling fan overheat condition, and either system 1 switch 110 or system 2 switch 112 is in the "ON" state.

Fifth power relay 76 provides +28V DC power to SYSTEM #6. The energized state of this relay is defined as when DC power is applied to ACSS 10, there is no smoke event, there is no cooling fan overheat condition, and either system 1 switch 110 or system 2 switch 112 is in the "ON" state.

ECS relay 56 provides 8 seconds (tolerance of +/−0.5 seconds) of holdup time (ECS relay 56 staying in the energized state) after the grounded output of the Cooling Status command from latched cooling fault relay 160 is removed from pin X2 of ECS relay 56 or when DC power is removed. ECS relay 56 allows for a graceful power-down of all systems that are using AC power. As long as DC power is applied to ECS relay 56 and when the COOLING STATUS COMMAND SIGNAL 220 output from pin A1 of latched cooling fault relay 160 is commanded to the grounded state, ECS relay 56 immediately energizes. Once the grounded state is removed from pin X2 of ECS relay 56, the de-energized state of ECS relay 56 is delayed for 8 seconds. The specific time delay for ECS relay 56 can be increased or decreased as necessary to meet specific system requirements for shutdown.

Figure 20:
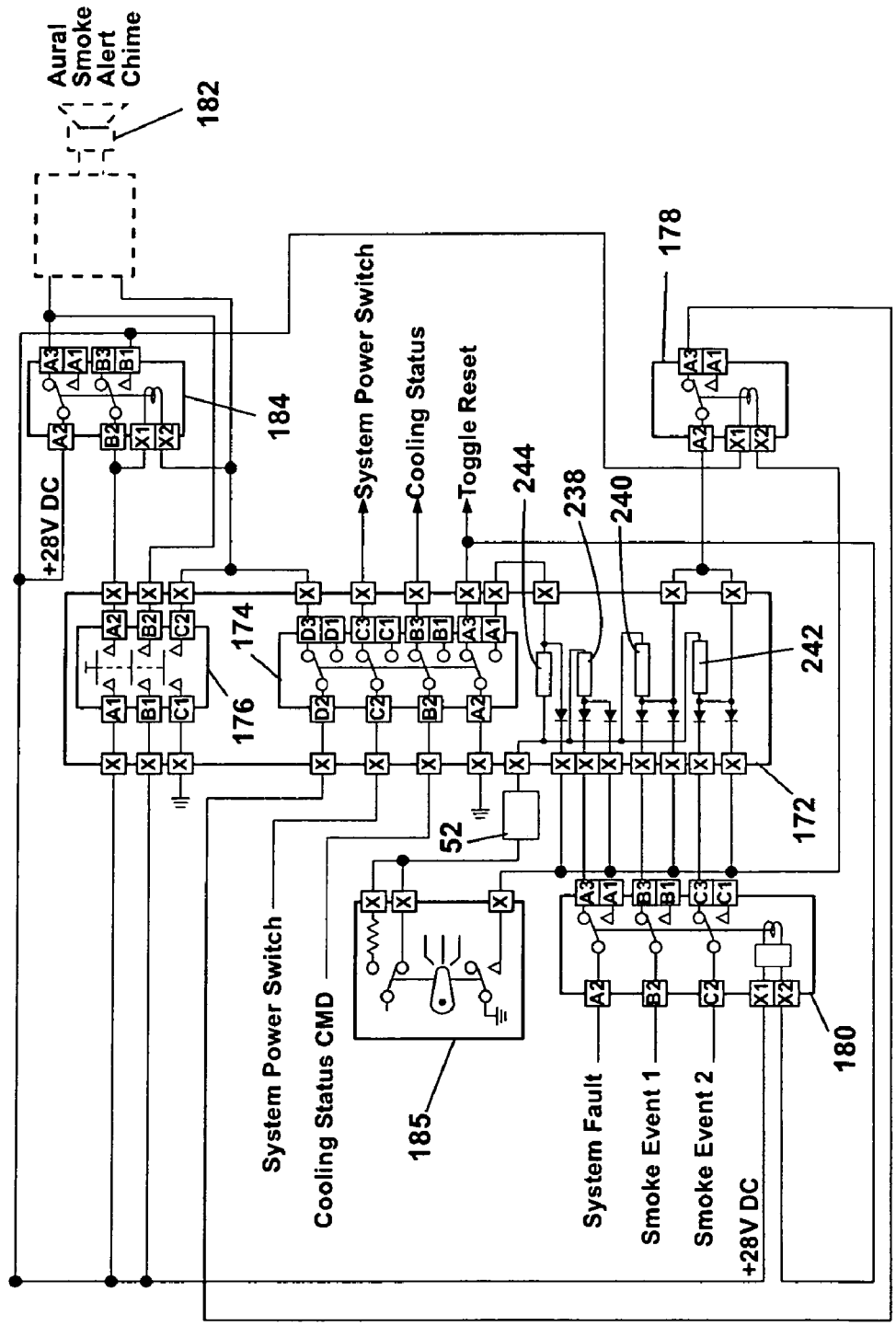
FIG. 20 is a schematic showing signal outputs associated with a flight deck panel of the present invention.
Figure 22A:
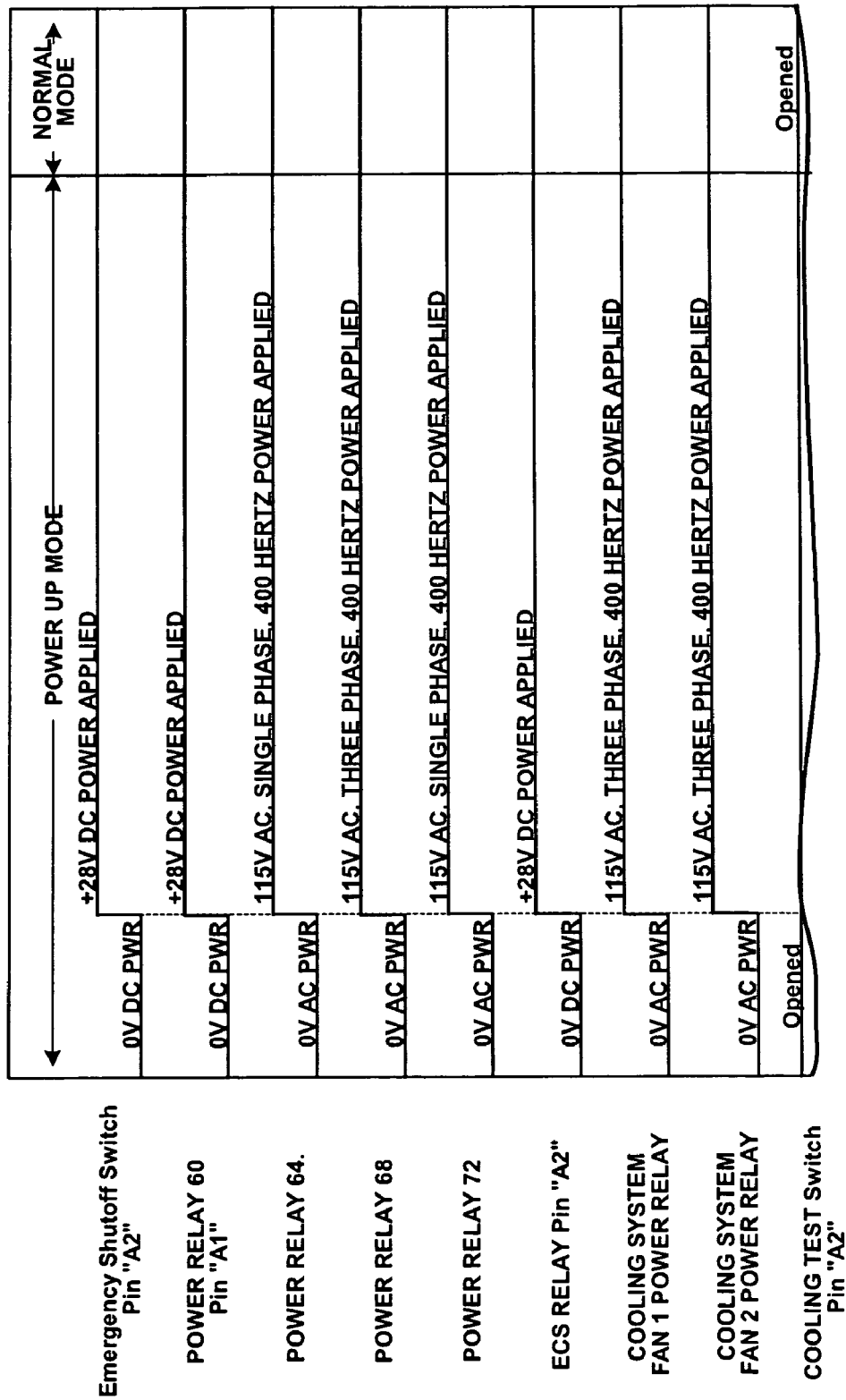
FIG. 22A is a first portion of a timing chart for a power up mode of operation for a system of the present invention.
Figure 22B:
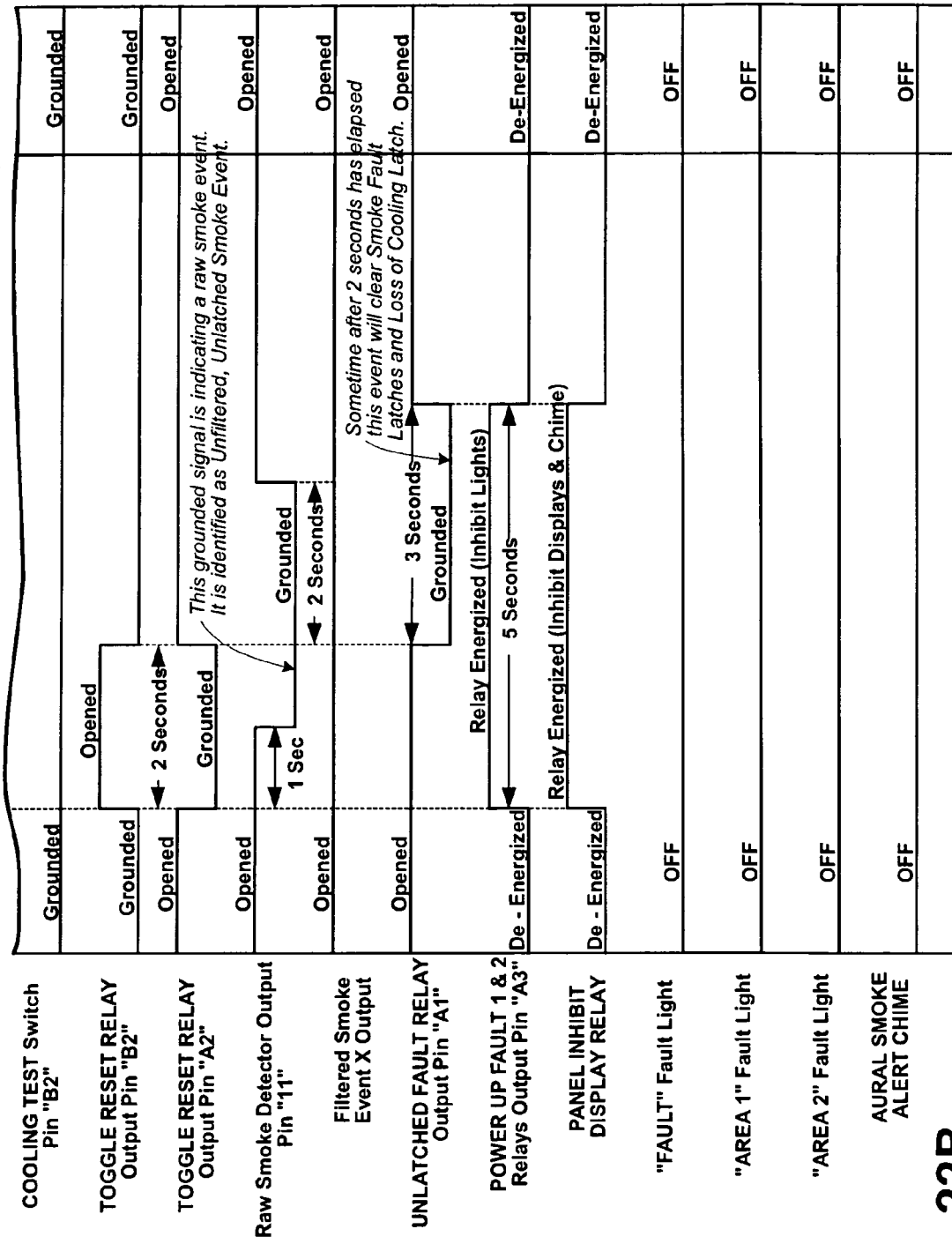
FIG. 22B is a second portion of the timing chart of FIG. 22A.
Figure 23A:
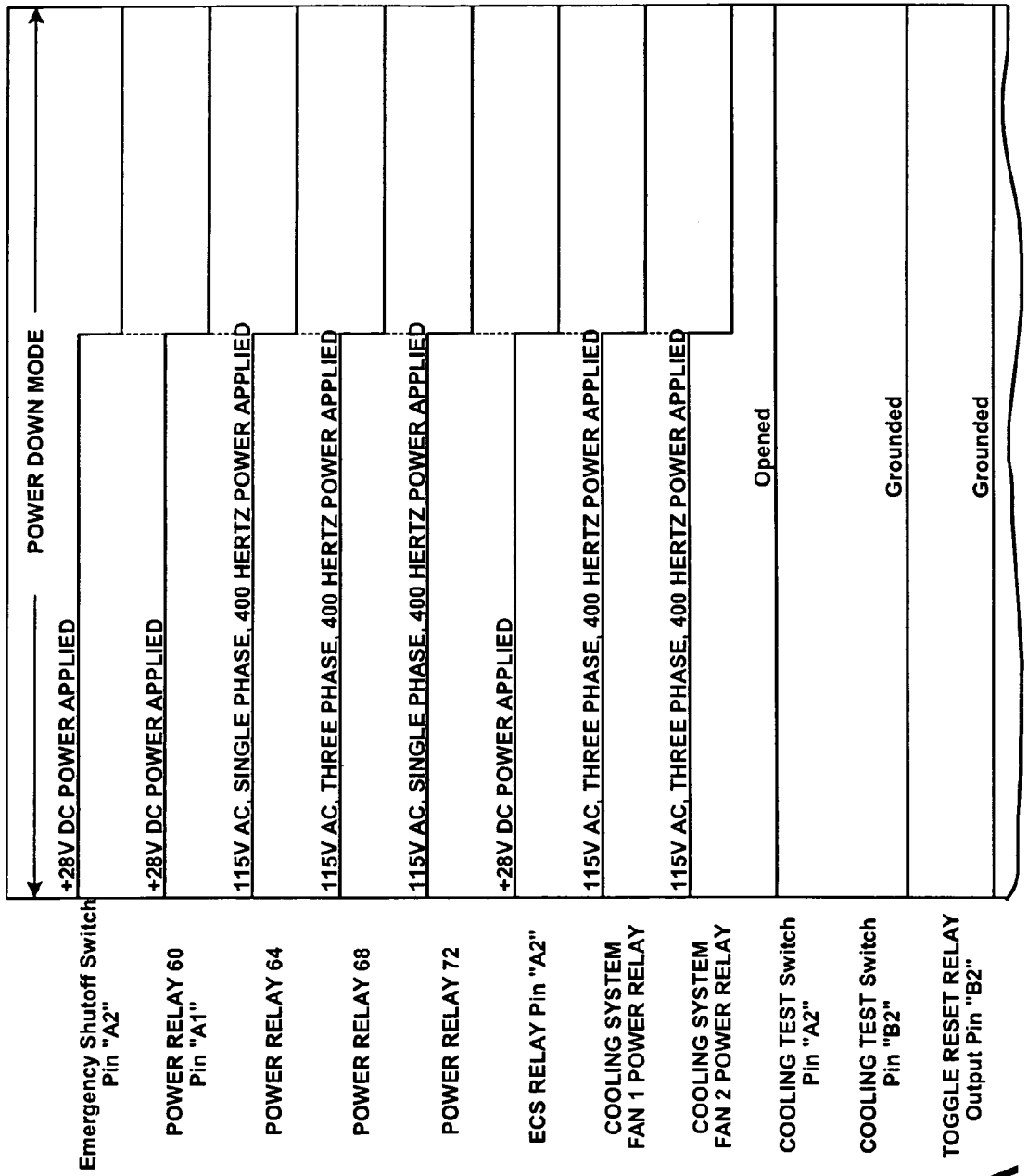
FIG. 23A is a first portion of a timing chart for a power down mode of operation for a system of the present invention.
Figure 23B:
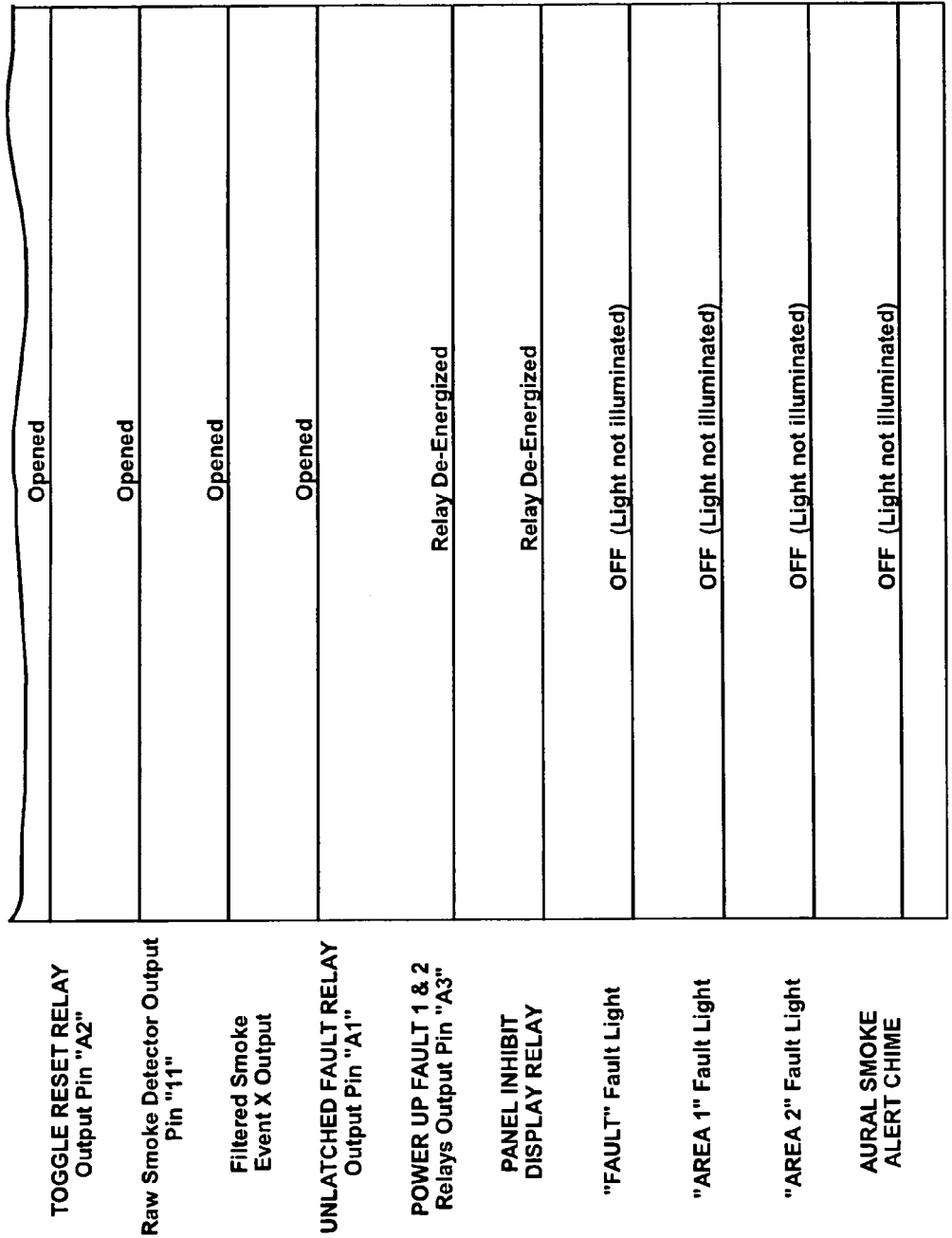
FIG. 23B is a second portion of the timing chart of FIG. 23A.
Figure 24A:
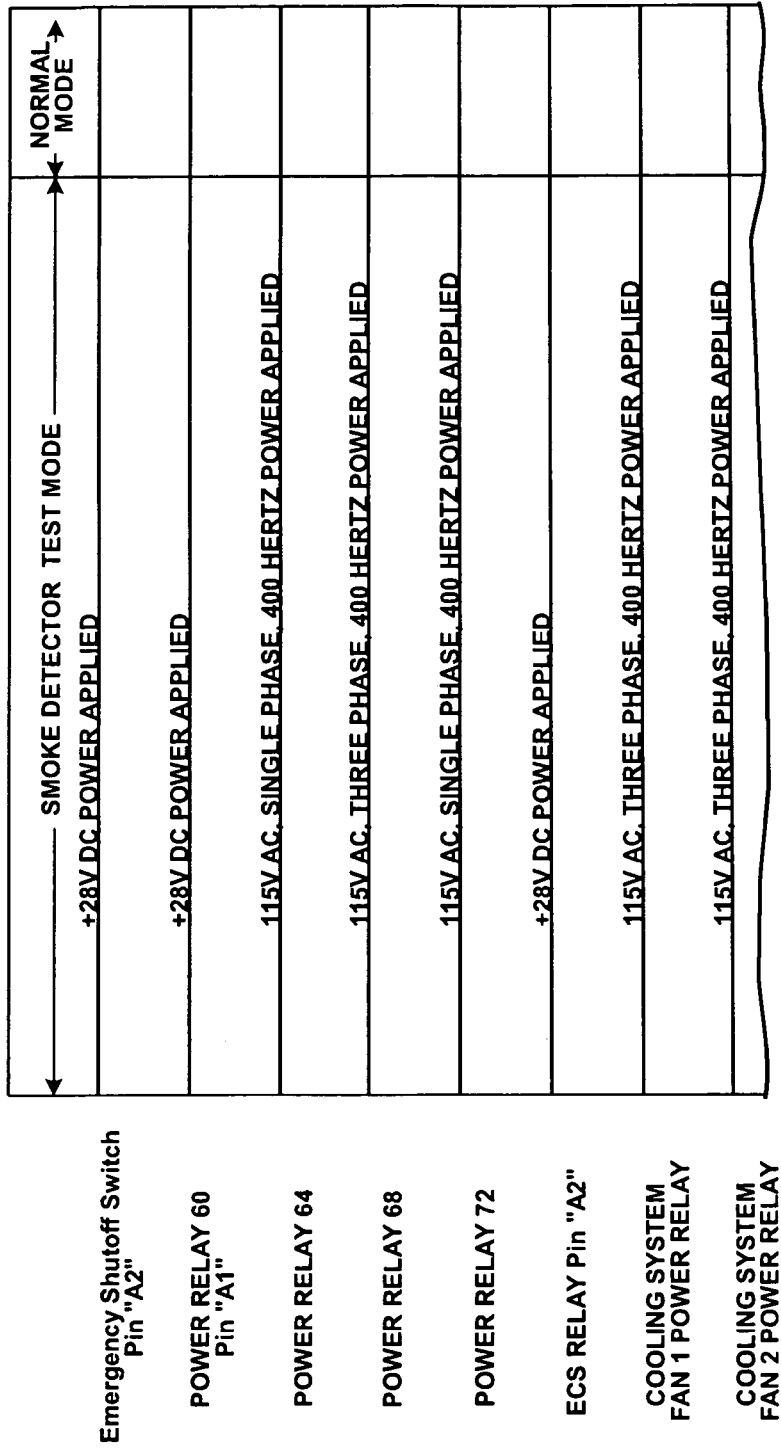
FIG. 24A is a first portion of a timing chart for testing of smoke detectors for a system of the present invention.
Figure 24B:
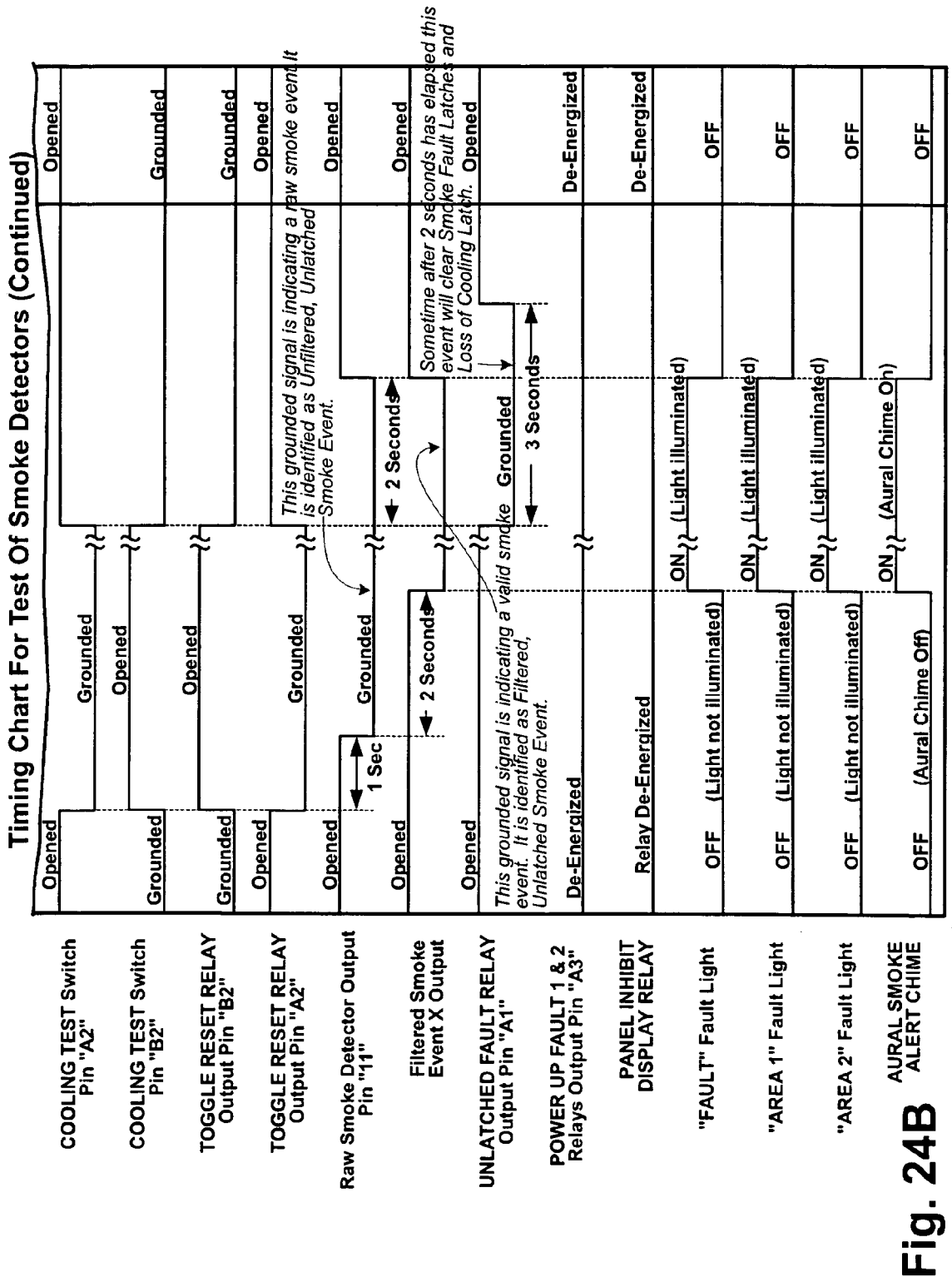
FIG. 24B is a second portion of the timing chart of FIG. 24A.

Referring to FIG. 20, if there is no smoke in the cooling systems, when an operator presses the smoke chime/mute/test switch 176 in flight deck area 16, +28V DC power and a grounded output signal are supplied to existing aircraft aural smoke alert chime 182 for annunciating an aural smoke alert. After the operator releases smoke chime/mute/test switch 176, +28V DC power and the grounded output signal are removed from the existing aircraft system. This removes the smoke annunciating tone from aural smoke alert chime 182.

If system master switch 174 is in the ON position and there is a smoke event in one of the cooling systems, then either one or both of the SMOKE EVENT 1 FAULT and SMOKE EVENT 2 FAULT signals are actively grounded. The grounded signal(s) will display one or both of an AREA 1 smoke display 240 or an AREA 2 smoke display 242, located on smoke chime/mute/test switch 176. The grounded signal(s) are also passed to aural smoke alert chime 182 to annunciate an aural smoke alert. Once aural smoke alert chime 182 is on, flight crew can press the smoke chime/mute/test switch 176 in flight deck area 16 to remove the aural smoke alert tone. As the operator presses smoke chime/mute/test switch 176, aural chime mute relay 184 energizes. This removes +28V DC power from the existing aircraft system for annunciating an aural smoke alert tone. Aural chime mute relay 184 latches in a MUTE ALARM position and aural smoke alert chime 182 remains muted until either a DC power cycle occurs, an operator cycles system master switch 174, or the smoke event no longer exists in the cooling system. An existing master dim & test switch 185 is also shown connected to ACSS 10.

A fault display 238 located on flight deck panel 172 is still enabled when system master switch 174 is in the OFF position. If a smoke fault or cooling fault occurs when system master switch 174 is in the OFF position, the associated fault display 238 and a FAIL (OFF) display 244 are illuminated. If the operator presses cooling test switch 132 for a couple of seconds, then this will command ACSS 10 to perform a test. If the fault no longer occurs, after ACSS 10 has performed its test (a total of approximately 5 seconds) fault display 238 is extinguished. If a fault still occurs, then fault display 238 remains illuminated. If the operator transitions system master switch 174 from the OFF position to the ON position, the illuminated fault display 238 is commanded off for 5 seconds (this does not mean the fault is not present). If the fault no longer occurs, then after ACSS 10 has performed its test (a total of approximately 5 seconds), fault display 238 will not reappear. If a fault still occurs, fault display 238 is re-illuminated after the system test is completed. The OFF display 244 on system master switch 174 is also illuminated when system master switch 174 is pressed into the OFF position.

If system master switch 174 is pressed into the OFF position, the cooling systems are commanded to power down and AC power is removed from the power relays and from any electronic units supplied by ACSS 10. Any of the displays 238, 240, or 242 which are illuminated on flight deck panel 172 continue to be illuminated when system master switch 174 is placed in the OFF position. Only an OFF indicator of system master switch 174 changes when system master switch 174 is placed in the OFF position.

Panel inhibit display relay 180 creates a 5 second energized pulse signal after a system power cycle or when an operator in flight deck area 16 transitions system master switch 174 from the OFF position to the ON position. This prevents nuisance faults from appearing on flight deck panel 172 during an ACSS 10 power up mode or during a restart of ACSS 10. After the 5 second time has elapsed, panel inhibit display relay 180 de-energizes, removing the grounded signal from pin X2 of panel inhibit display relay 180.

Negative relay control logic representation is described herein. In another preferred embodiment, positive relay logic is substituted for negative relay logic. Implementation of the ACSS 10 of the present invention can include: positive relay logic, negative relay logic, or mixed relay logic. The logic can also be implemented in a solid state electronics unit using integrated circuits (not shown).

Referring next to FIGS. 21A and 21B, examples are provided of discrete inputs and power outputs in a power control logic table for a system of the present invention.

Referring to FIGS. 22A, 22B, 23A, 23B, 24A and 24B simplistic operations of power applied and annunciation for a power up mode, a power down mode and smoke detector testing are depicted. FIGS. 22A, 22B, 23A, 23B, 24A and 24B assume that aircraft AC power is available to ACSS 10, system master switch 174 located on flight deck panel 172 is in the "ON" position, either System 1 switch 110 or System 2 switch 112 is in the "ON" position, and there are no smoke event faults or cooling system faults.

Figure 25:
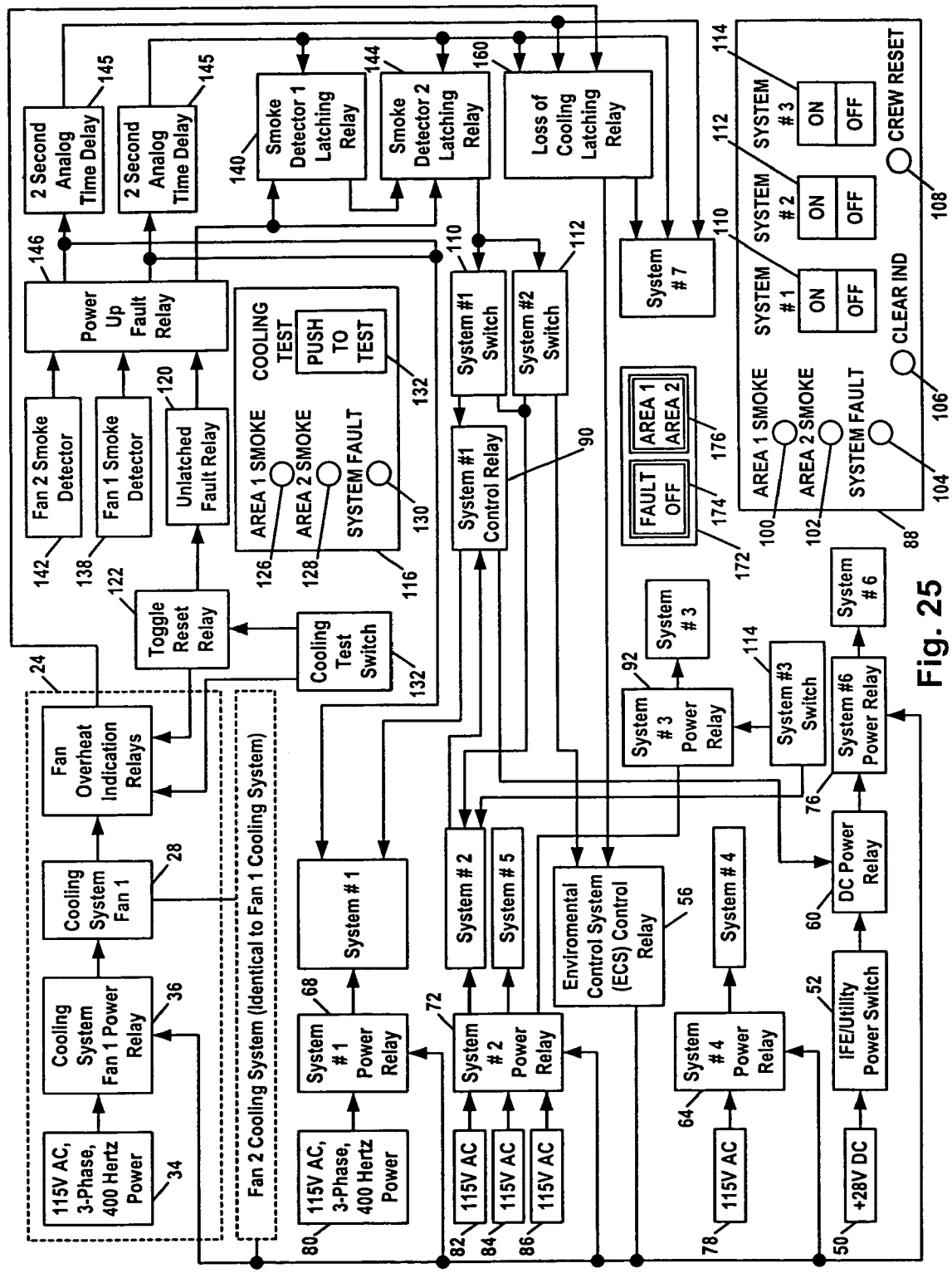
FIG. 25 is a diagrammatic presentation of the components, connections and major signals/commands for a system according to a preferred embodiment of the present invention.

Referring to FIG. 25, an ACSS according to one preferred embodiment of the present invention includes two cooling subsystems and two smoke detector subsystems, supported by a plurality of electrical panels, power relays, control relays, panels and switches. Multiple similar system configurations are also possible within the scope of the present invention, by varying quantities of cooling subsystems, smoke detector subsystems and/or the other components. The ACSS of FIG. 25 supports a plurality of electronic units, providing control to power up, test, monitor, and shut down cooling to the electronic units both during normal system operation and in response to smoke events and cooling system faults. The ACSS logic also enables either manual or automatic restarts of the cooling subsystems following either smoke events or cooling system faults, or combinations of these faults.

ACSS 10 operates using a hierarchy of control. Any cooling system fault immediately shuts down any operating cooling system fans. A smoke event normally triggers a delayed shutdown of the cooling system fans, allowing for a graceful shutdown. A cooling system fault overrides a concurrent smoke event to immediately shut down the cooling system. Therefore, delayed shutdown in response to a smoke event proceeds in the absence of a cooling system fault.

The ACSS of the present invention has several advantages. The ACSS provides a quickly implementable design using standard relay logic, which does not require a custom electronics unit design traditionally used for such an application. A time delay acts as a Smoke Persistence Filter to reduce false smoke detector alarms. An automatic power-up test feature eliminates the need for operator interaction when the system is powered up. A limited crew reset capability in lieu of a maintenance-only reset gives crew sufficient control to address nuisance faults, etc. while locking out restart of overheated fans which could be faulted. A fault status is retained through a power cycle of any duration. A fault status requires manual intervention via crew reset or a cooling test to restore the ACSS system following appropriate investigation. The ACSS 10 relay logic and delay logic prevent indicators from inadvertently illuminating during a power transition. A single maintenance switch provides: system reset capability; a manual initiated self test; and indicator test capability.

Except after use of emergency shutoff switch 52 and upon detection of smoke, interfacing systems receive an imminent shutdown status approximately 8 seconds before ACSS system power is actually removed. This provides the interfacing systems time to prepare for shutdown and informs off-board systems that a power down is about to happen and the reason for power down, such as smoke, cooling system fault, or the system switches are manually shut off, etc. For safety reasons, the ACSS is immediately shut down following a transition of emergency shutoff switch 52 or following detection of smoke. Fans are always immediately shut down to prevent the possible propagation of smoke between areas within the aircraft.

ACSS 10 provides three (3) types of smoke indicators:
1. A Filtered Latched smoke indicator informs maintenance of a smoke condition and the affected area(s) even after the event has occurred and been cleared following automatic powering down of the system. This capability is used for follow-on fault isolation and troubleshooting.
2. Filtered Real Time smoke indication is provided to inform flight deck personnel of an active smoke event and when the smoke event is no longer present.
3. A crew-clearable Filtered Latched Area smoke indication is provided that will remain illuminated until acknowledged by the crew. During a smoke event the effected area smoke indicator will latch in the illuminated state. Once acknowledged, the crew can press a clear momentary switch to update the indicator to the current status. If smoke is still present, the indicator will again illuminate. If the smoke has cleared, pressing the clear momentary switch will cause the indicator to go off until a future smoke event. This feature is especially beneficial to a cabin crew person who is attempting to locate the source of smoke (for example, in a galley or other system). With this feature, the indicator cannot illuminate and then extinguish without crew acknowledgement. It also provides a way to clear the latch state and display the updated current status once the smoke event has been acknowledged.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A control system disposed in a mobile platform, operable to control at least one electronic unit and at least one cooling device, the system comprising:
   a smoke detector in communication with the electronic unit, the smoke detector operably identifying a smoke event in the electronic unit;
   a cooling system having the cooling device in communication with the at least one electronic unit to operably cool the at least one electronic unit, and a cooling fan;
   at least one time delay unit operable to create a predetermined time period persistence delay; and
   a plurality of relays connectable to the at least one electronic unit, the smoke detector and the cooling system, including at least the following:

a first relay operable to immediately de-energize the cooling system following a cooling system fault; and a second relay operable to de-energize the cooling system after identification of the smoke event and following the persistence delay; and a thermal switch located inside the cooling fan positionable into an OPEN state when an overheat condition inside the cooling fan occurs.

2. The system of claim 1, comprising a plurality of control switches operable to control operation of at least one of the electronic unit, the smoke detector, the cooling device and at least one of the plurality of relays.

3. The system of claim 1, comprising at least one panel having a plurality of indicators and at least one of the control switches.

4. The system of claim 3, wherein the plurality of indicators comprises at least one latched on system fault indicator operably illuminated upon initiation of one of the smoke event and the cooling system fault.

5. The system of claim 4, wherein the plurality of indicators further comprises at least one smoke mode indicator operably illuminated during the smoke event.

6. The system of claim 5, wherein the at least one panel comprises:

a power indicator panel having one of the system fault indicators and at least one of the control switches; and a maintenance panel having at least the smoke mode indicator and one of the system fault indicators.

7. The system of claim 6, wherein the maintenance panel further comprises a test switch operable to de-energize each of the system fault indicators and to initiate a cooling subsystem test.

8. The system of claim 7, comprising a first latching relay operable to maintain a de-energized state of the cooling system following the cooling system fault, wherein the test switch is further operable to reposition the first latching relay to re-energize the cooling system following the cooling system fault.

9. The system of claim 5, comprising a second latching relay operable to relay a smoke mode signal to the at least one smoke mode indicator.

10. A control system disposed in a mobile platform, operable to control at least one electronic unit and at least one cooling device, the system comprising:

a smoke detector in communication with the electronic unit, the smoke detector operably identifying a smoke event in the electronic unit;

a cooling system having the cooling device in communication with the at least one electronic unit, the cooling device including at least one cooling fan;

at least one time delay unit operable to create a predetermined time period persistence delay;

a plurality of relays connectable to at least one of the electronic unit, the smoke detector and the cooling system, including at least the following:

a first relay operable to immediately de-energize the cooling system following a cooling system fault; and a second relay operable to de-energize the cooling system after identification of the smoke event and following the persistence delay; and a grounded output signal operatively produced by the cooling fan.

11. The system of claim 10, comprising:

a thermal switch operably providing the grounded output signal;

wherein a cooling device sensed overheat condition operably positions the thermal switch in an open position, blocking the grounded output signal.

12. The system of claim 1, comprising a plurality of power relays each operable to distribute electrical power to at least one of the electronic unit, the smoke detector and the cooling device.

13. The system of claim 1, wherein the plurality of relays further comprises at least one fault relay operable to shut down the cooling system.

14. The system of claim 1, wherein the time delay unit comprises one of a delay timer and an analog timer.

15. A combined smoke detector and cooling control system operable to control a plurality of electronic units, the system comprising:

a smoke detector in communication with the plurality of electronic units, the smoke detector operably identifying a smoke event in the plurality of electronic units a cooling system in communication with the plurality of electronic units;

a fan in the cooling system having a switch operable to indicate a cooling system fault;

a plurality of relays connectable to at least one of the plurality of electronic units, the smoke detector and the cooling system, including at least one each of the following:

a first relay operable to immediately de-energize the cooling system after indication of the cooling system fault;

a second relay operable after a predetermined time period persistence delay, the second relay operable to de-energize the cooling system after identification of the smoke event and following the persistence delay; and a control relay operable to provide a hold signal to gracefully delay a power down of select ones of the plurality of electronic units.

16. The system of claim 15, comprising a plurality of power relays operable to connect an alternating electrical current to select ones of the plurality of electronic units requiring the alternating electrical current for operation.

17. The system of claim 14, comprising:

at least one smoke indicator operably illuminated in response to the smoke event;

wherein the smoke indicator operably remains illuminated after an automatic power down of the system and until manual intervention by a maintenance personnel.

18. The system of claim 15, comprising:

a smoke indication signal operably provided by the smoke detector in response to the smoke event; and a real-time smoke indicator operable to immediately illuminate upon receipt of the smoke indication signal and immediately de-energize upon termination of the smoke event.

19. The system of claim 15, comprising:

a crew clearable area smoke indicator operably illuminating in response to the smoke event;

wherein the area smoke indicator operably remains illuminated until manually reset by a crew member.

20. A combined smoke detector and cooling control system operable to control a plurality of electronic units, the system comprising:

a smoke detector in communication with the plurality of electronic units, the smoke detector operably identifying a smoke event in the plurality of electronic units a cooling system in communication with the plurality of electronic units;

a fan in the cooling system having a switch operable to indicate a cooling system fault;

a plurality of relays connectable to at least one of the plurality of electronic units, the smoke detector and the cooling system, including at least one each of the following:

a first relay operable to immediately de-energize the cooling system after indication of the cooling system fault; and a second relay operable after a predetermined time period persistence delay, the second relay operable to de-energize the cooling system after identification of the smoke event and following the persistence delay; and a plurality of isolation diodes operably preventing system activation in an incorrect state.

21. A method for controlling an aircraft cooling and smoke system having a plurality of relays connected to at least one smoke detector and at least one cooling subsystem, the cooling subsystem operable to cool a plurality of electrical components, the method comprising:

detecting a smoke event using the smoke detector;

generating a smoke mode signal in response to the smoke event;

applying a time delay unit to operably delay the smoke mode signal;

performing a delayed shutdown of the cooling subsystem and the electrical components;

latching both the cooling subsystem and the electrical components in an off state using a first relay;

energizing a second relay to operably create an open circuit between the smoke detector and the first relay; and creating an energized pulse signal having a limited duration using the second relay to operably prevent nuisance faults during a system power up mode.

22. A method for controlling an aircraft cooling and smoke system having a plurality of relays connected to at least one smoke detector and at least one cooling subsystem, the cooling subsystem operable to cool a plurality of electrical components, the method comprising:

detecting a smoke event using the smoke detector;

generating a smoke mode signal in response to the smoke event;

applying a time delay unit to operably delay the smoke mode signal;

performing a delayed shutdown of the cooling subsystem and the electrical components;

latching both the cooling subsystem and the electrical components in an off state using a first relay;

grounding a smoke detector sensor output following the smoke event; and energizing a primary coil of the first relay.

23. The method of claim 22, comprising retaining the primary coil in an energized state for a duration of the smoke event.

24. The method of claim 21, comprising:

manually pressing a test switch;

energizing a third relay; and grounding an output signal of the energized third relay for a predetermined time interval.

25. The method of claim 24, comprising:

applying the grounded output signal of the energized third relay to a fourth relay for a predetermined interval; and energizing the fourth relay using the grounded output signal of the energized third relay following the predetermined interval.

26. The method of claim 25, comprising providing continuity to a plurality of system indicators from the fourth relay.

27. The method of claim 21, comprising:

transitioning a system power switch from an off to an on position; and toggling a test mode signal from a fifth relay to a smoke detector test input prior to the detecting step.

28. A method to control at least one cooling subsystem connected to a plurality of electrical components in response to one of a smoke detector smoke event and a cooling system fault for a mobile platform, the method comprising:

changing a thermal switch position in response to the cooling system fault;

immediately shutting down the cooling subsystem in response to changing the thermal switch position;

blocking an automatic restart of the cooling subsystem using a test switch; and manually changing a position of the test switch to operably perform a maintenance test of the cooling subsystem prior to initiating a manual cooling subsystem restart.

29. The method of claim 28, comprising generating a system fault status.

30. The method of claim 28, comprising retaining the system fault status during a system power cycle of any duration.

31. The method of claim 30, comprising:

blocking the automatic restart of the cooling subsystem during the system power cycle of any duration; and enabling a manual restart of the cooling subsystem using the test switch following the system power cycle of any duration.

32. The method of claim 28, comprising performing an operational test of the cooling subsystem during a power up cycle of the system.

33. The method of claim 32, comprising disconnecting a system power source to operably prevent the system power up cycle if the cooling system fault is identified during the operational test.

34. The method of claim 28, comprising de-energizing both an overheat relay and a first coil of an overheat latch relay in response to the thermal switch position change.

35. The method of claim 34, comprising energizing a second coil of the overheat latch relay following the de-energizing step for the first coil.

36. The method of claim 35, comprising sending a grounded signal from the second coil to a latched fault relay to initiate the immediate shutting down step.

37. The method of claim 28, comprising initiating a delayed shutdown of the cooling subsystem following the smoke detector smoke event if there is no cooling subsystem fault.

38. The method of claim 28, comprising overriding the test switch to operably enable the automatic restart of the cooling subsystem by enabling a remote momentary switch, operable following the smoke detector smoke event and operably disabled following the cooling system fault.

39. The method of claim 28, comprising overriding the test switch to operably enable the automatic restart of the cooling subsystem by transitioning a two state system master switch between an OFF and an ON position.

40. A method for controlling a plurality of electrical components of a mobile platform operably using signals from at least one smoke detector, at least one cooling subsystem and a plurality of relays, the method comprising steps in the order of:

(a) generating a cooling system fault signal if a cooling system fault occurs;
(b) immediately shutting down the cooling subsystem and the electrical components if the cooling system fault signal is generated;
(c) detecting a smoke event using the smoke detector if the cooling system fault signal is not present;
(d) generating a smoke mode signal in response to the smoke event; and
(e) performing a delayed shutdown of the cooling subsystem and the electrical components using a time delay unit to operably delay the smoke mode signal.

41. The method of claim 40, comprising transferring an alternating current electrical power through a first plurality of power relays to first ones of the electrical components prior to the step (a).

42. The method of claim 41, comprising transferring a direct current electrical power through a second plurality of power relays to second ones of the electrical components.

43. The method of claim 40, comprising performing an automatic test of the smoke detector during a power up cycle of the system prior to the step (a).

44. The method of claim 43, comprising delaying the power up cycle of the system until completion of the automatic test of the smoke detector.

45. The method of claim 44, comprising latching a fault relay to a fault mode upon a failure of the operational test.

46. The method of claim 40, comprising using a real time smoke indication signal from the smoke detector to illuminate at least one smoke indicator upon detection of the smoke event following the step (d) and before the step (e).

47. The method of claim 40, comprising delaying a predetermined time interval using the time delay during the step (e).

48. The method of claim 40, comprising initially providing a reset control for the cooling subsystem operable after the delayed shutdown.

49. The method of claim 40, comprising initially providing a reset control for the cooling subsystem operable after any shutdown of the cooling subsystem due to one of the smoke event and the cooling system fault.

50. The method of claim 40, comprising energizing an audible alarm following the step (c).

51. The method of claim 50, comprising:
muting the audible alarm during the smoke event using a mute function; and
automatically clearing the mute function when the smoke event ends.

52. The method of claim 40, comprising disabling a manual restart of the cooling subsystem following one of step (b) and step (e) if one of an active smoke event and a fan overheat condition exists.

* * * * *